US012358254B2

(12) United States Patent
Hara

(10) Patent No.: US 12,358,254 B2
(45) Date of Patent: Jul. 15, 2025

(54) GLUER APPARATUS, AND CONVEYANCE ASSIST DEVICE FOR GLUER APPARATUS

(71) Applicant: KABUSHIKI KAISHA ISOWA, Kasugai (JP)

(72) Inventor: Yuta Hara, Kasugai (JP)

(73) Assignee: Kabushiki Kaisha Isowa, Aichi (JP)

( * ) Notice: Subject to any disclaimer, the term of this patent is extended or adjusted under 35 U.S.C. 154(b) by 77 days.

(21) Appl. No.: 18/310,185

(22) Filed: May 1, 2023

(65) Prior Publication Data

US 2023/0373185 A1 Nov. 23, 2023

(30) Foreign Application Priority Data

May 20, 2022 (JP) ................................ 2022-083096

(51) Int. Cl.

| | |
|---|---|
| ***B31B 50/42*** | (2017.01) |
| ***B31B 50/04*** | (2017.01) |
| ***B31B 50/62*** | (2017.01) |
| *B31B 100/00* | (2017.01) |
| *B31B 120/70* | (2017.01) |

(52) U.S. Cl.

CPC .......... *B31B 50/624* (2017.08); *B31B 50/042* (2017.08); *B31B 2100/00* (2017.08); *B31B 2120/70* (2017.08)

(58) Field of Classification Search

USPC ............................................ 493/131; 49/131

See application file for complete search history.

(56) References Cited

U.S. PATENT DOCUMENTS

| | | | | |
|---|---|---|---|---|
| 2005/0075230 | A1* | 4/2005 | Moshier | B31B 50/36 493/51 |
| 2011/0052814 | A1 | 3/2011 | Hatano et al. | |
| 2015/0024917 | A1* | 1/2015 | Nadachi | B31B 50/54 493/53 |
| 2017/0274612 | A1 | 9/2017 | Nadachi et al. | |

FOREIGN PATENT DOCUMENTS

| | | |
|---|---|---|
| JP | 2010-052211 A | 3/2010 |
| JP | 2016-074133 A | 5/2016 |

* cited by examiner

*Primary Examiner* — Chinyere J Rushing-Tucker

(74) *Attorney, Agent, or Firm* — Crowell & Moring LLP

(57) ABSTRACT

Provided is a gluer apparatus capable of reducing slowdown or delay of a to-be-bonded part due to a contact-type glue gun, and a conveyance assist device for the gluer apparatus. A folder-gluer is configured to apply a glue to a gluing tab of a corrugated paperboard sheet by a glue application device. The corrugated paperboard sheet comprises a folding panel provided with the gluing tab, and a non-folding panel connected to the folding panel through a connection part. A lower conveyance belt of the folder-gluer is configured to convey the non-folding panel in a conveyance direction while contacting the non-folding panel. Further, a conveyance assist device of the folder-gluer is configured to convey the folding panel in the conveyance direction while contacting the folding panel, during contact between a glue application device and the gluing tab.

14 Claims, 15 Drawing Sheets

GLUER APPARATUS, AND CONVEYANCE ASSIST DEVICE FOR GLUER APPARATUS

RELATED APPLICATIONS

This application claims priority to Japanese Patent Application No. 2022-083096, filed on May 20, 2022, the entire content of which is incorporated herein by reference.

BACKGROUND OF THE INVENTION

1. Field of the Invention

The present invention relates to a corrugated paperboard sheet conveying technique for use in a gluer apparatus for applying an adhesive to a corrugated paperboard sheet.

2. Description of the Related Art

Heretofore, a corrugated paperboard box making machine has been configured to, e.g., subject a corrugated paperboard sheet which is flowing on a box making line to processing such as printing and slotting, then adhesive application, folding and bonding. Examples of the adhesive to be used may include a polyvinyl acetate resin-based adhesive.

Patent Document 1 (JP-A 2010-052211) describes a technique of applying a glue to a gluing tab of a corrugated paperboard sheet which is traveling on a box making line. In the technique described in the Patent Document 1, a contact-type glue gun is used to discharge and apply a glue to the gluing tab.

SUMMARY OF THE INVENTION

Technical Problem

The contact-type glue gun is configured to discharge a glue while contacting the gluing tab. Thus, it can more stably apply a glue to the gluing tab, as compared to a contactless-type glue gun. On the other hand, when contacting the gluing tab, the contact-type glue gun generates a frictional force resistive to the movement of the gluing tab in a conveyance direction of the corrugated paperboard sheet. This frictional force is likely to slow down or delay the conveyance speed of the gluing tab, as comparted to other parts. A given predicted period of time during which the gluing tab and the contact-type glue gun would be in contact with each other depending on the conveyance speed of the corrugated paperboard sheet can be set as a period of time during which a glue is discharged from the contact-type glue gun to one gluing tab. However, due to occurrence of delay in the conveyance direction, glue application to a trailing portion of the gluing tab in the conveyance direction becomes insufficient, or no glue is applied to the trailing portion. Consequently, even after folding and bonding operations, bonding is likely to become insufficient.

In particular, the above delay in conveyance is likely to increase as the depth of an intended corrugated paperboard box becomes shallower. In a connection part connecting a first panel provided with a gluing tab and a second panel adjacent to the first panel together in the corrugated paperboard sheet as shown in, e.g., the Patent Document 1, a moment of inertia of area of the connection part becomes smaller as the dimension in the conveyance direction becomes shorter, i.e., the depth of the box becomes shallower. In a case where glue application by the contact-type glue gun is performed while the corrugated paperboard sheet is conveyed by allowing a belt of a conveyance device to contact a lower surface of the second panel, the first panel is inclined along an approximately horizontal plane obliquely toward an upstream side with respect to the conveyance direction around the connection part, due to a frictional force generated in the gluing tab. When the box has a shallower depth and consequently the moment of inertia of area of the connection part becomes smaller, the inclination increases, which is likely to cause an increase in the delay. Further, considering that a fulcrum is located on the side of the second panel being conveyed by the conveyance device, as the length of the first panel in a width direction orthogonal to the conveyance direction becomes longer, a larger moment is generated in the gluing tab, which is likely to cause an increase in the delay.

The present invention has been made to solve the above problems, and an object thereof is to provide a gluer apparatus capable of reducing slowdown or delay of a to-be-bonded part due to a contact-type glue gun, and a conveyance assist device for the gluer apparatus.

Solution to Problem

The present specification discloses a gluer apparatus for applying an adhesive to a to-be-bonded part of a corrugated paperboard sheet, wherein the corrugated paperboard sheet comprises: a non-folding panel; and a folding panel to be folded with respect to the non-folding panel after the adhesive is applied to the to-be-bonded part, wherein the to-be-bonded part is provided in the folding panel, and the folding panel is connected to the non-folding panel through a connection part, the gluer apparatus comprising: a first conveyance device configured to convey the non-folding panel in a conveyance direction while contacting the non-folding panel; an applicator device configured to apply the adhesive to the to-be-bonded part while contacting the to-be-bonded part; and a second conveyance device configured to convey the folding panel in the conveyance direction while contacting the folding panel, during contact between the applicator device and the to-be-bonded part.

The present invention is extremely beneficial when implemented as not only a gluer apparatus but also, e.g., a conveyance assist device mountable to a gluer apparatus.

The gluer apparatus and the conveyance assist device of the present invention can reduce delay of the to-be-bonded part due to a contact-type glue gun.

DETAILED DESCRIPTION OF THE PREFERRED EMBODIMENTS

First Embodiment

A folder-gluer as a first embodiment of a gluer apparatus of the present invention will now be described with reference to the drawings.

Figure 1:
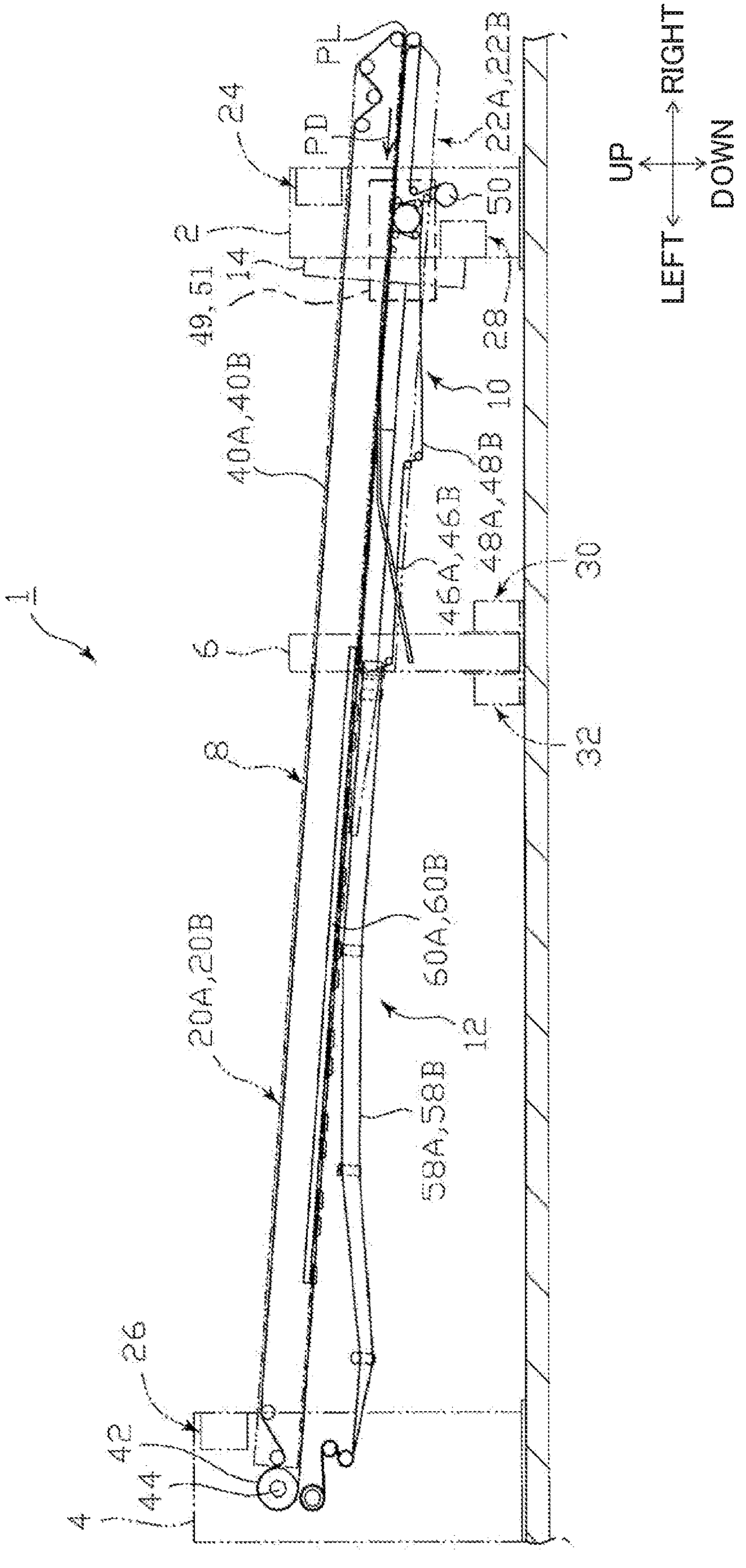
FIG. 1 is a front view schematically showing the overall configuration of a folder-gluer according to a first embodiment of the present invention.

FIG. 1 is a front view schematically showing a folder-gluer 1 according to the first embodiment. The folder-gluer 1 is an apparatus to be incorporated, e.g., as a part of a corrugated paperboard box making machine. The folder-gluer 1 is configured to receive a corrugated paperboard sheet subjected to processing such as printing and slotting in the paperboard box making machine, and subject the received corrugated paperboard sheet to glue application and then folding, thereby forming a box structure which is a box-structured (pre-assembled) corrugated paperboard sheet. For example, the corrugated paperboard box making machine comprises: processing devices including a printer such as a flexographic press, a creaser and a slotter, and has a function of subjecting corrugated paperboard sheets sequentially fed from a sheet feeding apparatus to processing such as printing, creasing/scoring, and slotting. Examples of a configuration employable to realize the functions of such a corrugated paperboard box making machine may include the configurations disclosed in JP-B 3652429. The processing devices such as a slotter of the corrugated paperboard box making machine are arranged on an inlet side (carry-in side) of the folder-gluer 1 in a conveyance direction PD (see FIG. 1) along which a corrugated paperboard sheet is conveyed. The box structure formed by the folder-gluer 1 is carried out of the folder-gluer 1 toward a counter-ejector as disclosed in the JP-B 3652429, and a given number of box-structured corrugated paperboard sheets are discharged as a batch of sheets or a sheet block (sheet stack). In the following description, on the basis of a direction along which the folder-gluer 1 (corrugated paperboard box making machine) is viewed from the front side thereof, for example, a direction perpendicular to an installation surface of the folder-gluer 1, a direction which is parallel to the installation surface and along which the devices are arranged side-by-side, and a direction perpendicular to the up-down direction and the right-left direction are referred to, respectively, as an up-down direction, a right-left direction and a front-rear direction, as illustrated in FIG. 1.

(Shape of Corrugated Paperboard Sheet)

Figure 2:
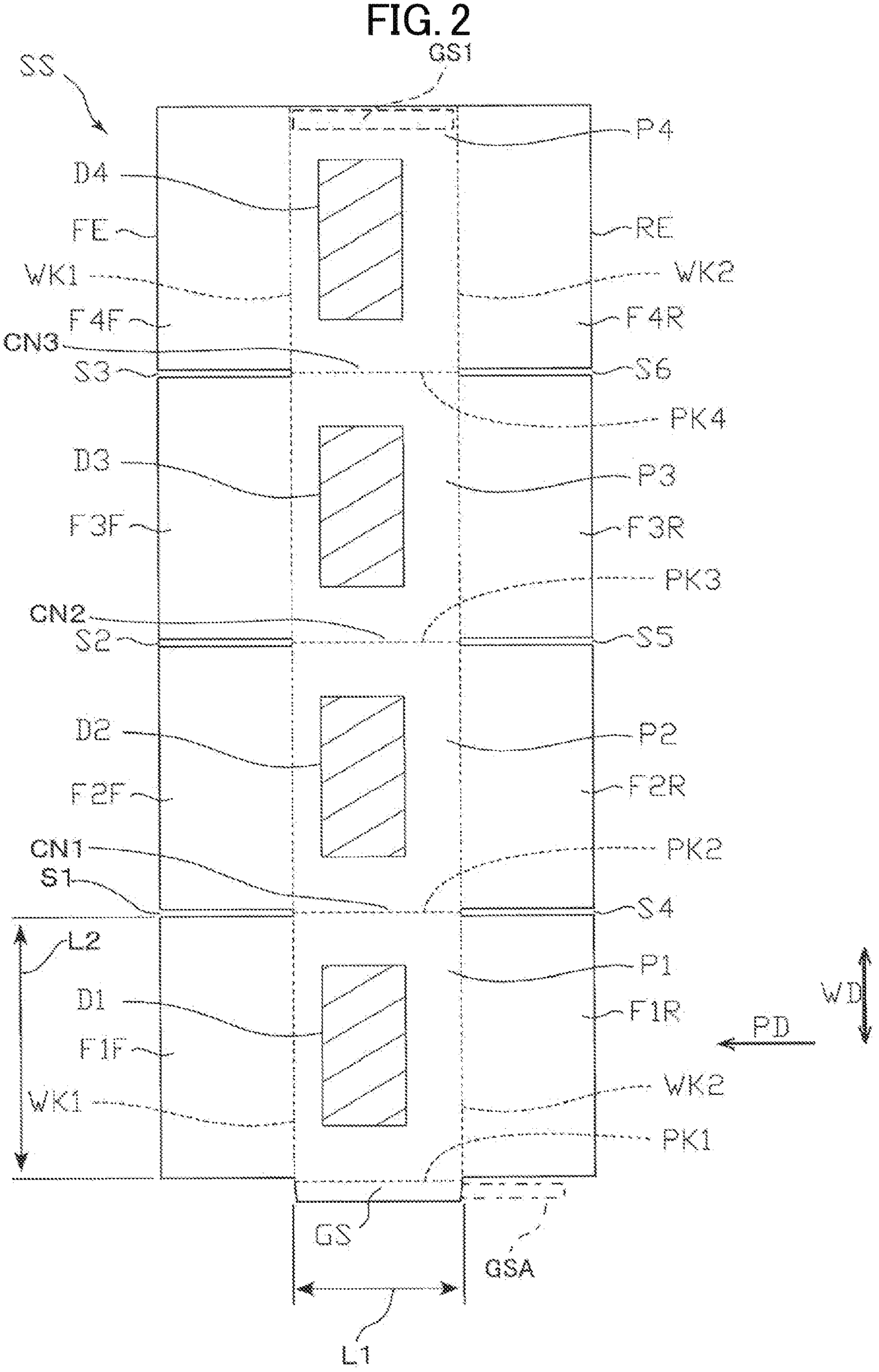
FIG. 2 is a diagram showing a corrugated paperboard sheet to be carried in the folder-gluer according to the first embodiment.

FIG. 2 shows a corrugated paperboard sheet SS to be carried in the folder-gluer 1 according to the first embodiment. The conveyance direction PD illustrated in FIG. 2 is a conveyance direction of the corrugated paperboard sheet SS in the folder-gluer 1, and a direction from the right side to the left side (right-to-left direction) in the folder-gluer 1. The width direction WD is a direction orthogonal to the conveyance direction PD, and the front-rear direction in the folder-gluer 1. The width direction WD is also a direction which is parallel to a planar surface of the corrugated paperboard sheet SS (planar surface of panels before folding) and orthogonal to the conveyance direction PD. In the first embodiment, the corrugated paperboard sheet SS comprises planar first to fourth panels P1 to P4, a gluing tab GS, four leading flaps F1F to F4F, and four trailing flaps F1R to F4R, as shown in FIG. 2. The first panel P1 or the fourth panel P4 is one example of the folding panel as set forth in the appended claims. The second panel P2 or the third panel P3 is one example of the non-folding panel as set forth in the appended claims.

The first to fourth panels P1 to P4 are arranged side-by-side along the width direction WD and connected to each other. The corrugated paperboard sheet SS also comprises three connection parts CN1 to CN3. The first panel P1 is connected to the second panel P2 through the connection part CN1. The second panel P2 is connected to the third panel P3 through the connection part CN2. The third panel P3 is connected to the fourth panel P4 through the connection part CN3. The length of each of the connection parts CN1 to CN3 along the conveyance direction PD is identical to the length of each of the first to fourth panels P1 to P4 along the conveyance direction PD.

The first panel P1 has opposite edges in the width direction WD, wherein the connection part CN1 (second panel P2) is connected to one of the opposite edges, and the gluing tab GS is provided to the other edge (outer or front edge). The gluing tab GS is formed to protrude outwardly from the font edge of the first panel P1 in the width direction WD. In the first embodiment, the gluing tab GS is formed in a trapezoidal shape whose breadth along the conveyance direction PD decreases slightly and gradually in a direction along the width direction WD from a base end of the gluing tab GS connected to the first panel P1 toward an outermost or distal end of the gluing tab GS. The length L1 of the base end (edge on the side of the first panel P1) of the gluing tab GS along the conveyance direction PD is identical to the length of the first panel P1 along the conveyance direction PD, i.e., the length of each of the connection parts CN1 to CN3 and the first to fourth panels P1 to P4 along the conveyance direction PD. The length L1 corresponds to a depth dimension of a corrugated paperboard box fabricated by forming the corrugated paperboard sheet SS into a box shape. The length L1 of the corrugated paperboard sheet SS in the first embodiment is set to, e.g., 100 mm. Further, the width L2 of each of the first to fourth panels P1 to P4 in the width direction WD is set to, e.g., 700 mm. It is to be understood that the length L1 is not limited to 100 mm, but may be greater than 100 mm or may be less than 100 mm. Similarly, the length L2 is not limited to 700 mm, but may be greater than 700 mm or may be less than 700 mm.

Further, the length L1 of the gluing tab GS needs not necessarily be identical to the length of the first panel P1 along the conveyance direction PD or the depth dimension of the corrugated paperboard box. For example, the length L1 of the gluing tab GS may be greater than the length of the first panel P1 along the conveyance direction PD. Like a protruding part GSA illustrated in FIG. 2, the gluing tab GS may be formed to protrude toward an upstream side in the conveyance direction PD while defining a slot like the after-mentioned trailing slot S4, thereby having a length greater than that of the first panel P1. Then, during bonding, after applying a glue to the protruding part GSA, the protruding part GSA may be glued to the trailing flap F4R. Further, the gluing tab GS needs not necessarily have a trapezoidal shape. For example, the gluing tab GS may have any other suitable shape such as a rectangular shape.

The four leading flaps F1F to F4F are connected, respectively, to leading edges (left edges in FIG. 2) of the first to fourth panels P1 to P4. Further, the four trailing flaps F1R to F4R are connected, respectively, to trailing edges (right edges in FIG. 2) of the first to fourth panels P1 to P4. Each of the first to fourth panels P1 to P4 has a respective one of four images D1-D4 printed by, e.g., a printer (illustration is omitted) disposed upstream of the folder-gluer 1. The images D1-D4 generally indicate information regarding a content in the fabricated corrugated paperboard box. It is to be understood that the corrugated paperboard sheet SS needs not necessarily be printed with an image.

The corrugated paperboard sheet SS has four crease lines PK1 to PK4 formed by a creaser (illustration is omitted) disposed upstream of the folder-gluer 1. The crease lines PK1 to PK4 are formed, respectively, in a coupling portion between the first panel P1 and the gluing tab GS and three coupling portions (connection parts CN1 to CN3) between adjacent ones of the first to fourth panels P1 to P4. The corrugated paperboard sheet SS also has three leading slots S1 to S3 and three trailing slots S4 to S6 formed by a slotter (illustration is omitted) disposed upstream of the folder-gluer 1. Each of the leading slots S1 to S3 is cut out to have an opening on the side of a leading edge of the corrugated paperboard sheet SS, and each of the trailing slots S4 to S6 is cut out to have an opening on the side of a trailing edge of the corrugated paperboard sheet SS. Each of the leading slots S1 to S3 is formed in a position aligned with a corresponding one of the trailing slots S4 to S6 in the conveyance direction PD. Each of the connection parts CN1 to CN3 is formed in a portion sandwiched between corresponding ones of the leading slots S1 to S3 and the trailing slots S4 to S6 in the conveyance direction PD.

The corrugated paperboard sheet SS further has two score lines WK1, WK2. The score lines WK1, WK2 are formed, respectively, in a coupling portion between the panels and the leading flaps and a coupling portion between the panels and the trailing flaps by, e.g., a scorer of a heretofore-known corrugating machine, to extend along the width direction WD. The crease lines PK1 to PK4 and the score lines WK1, WK2 are formed in a back surface of the first to fourth panels P1 to P4. A box structure which is a glued box-structured corrugated paperboard sheet can be formed into a cubic corrugated paperboard box by bending the flaps of the box structure.

(Overall Configuration of Folder-Gluer)

As shown in FIG. 1, the folder-gluer 1 comprises an inlet-side holding member 2, an outlet-side (carry-out side) holding member 4, and an intermediate holding member 6. Each of the holding members is fixed to the installation surface. The folder-gluer 1 also comprises a conveyance device 8, a first bending station 10, and a second bending station 12. The conveyance device 8 is configured to convey the corrugated paperboard sheet SS in the conveyance direction PD along a conveyance path PL. The first bending station 10 is configured to bend the first panel P1 and the fourth panel P4 of the corrugated paperboard sheet SS from a flat state (0-degree position) to an about 90-degree position. The second bending station 12 is provided on the outlet side of the first bending station 10, and configured to bend the first panel P1 and the fourth panel P4 from the about 90-degree position to a 180-degree position.

Figure 3:
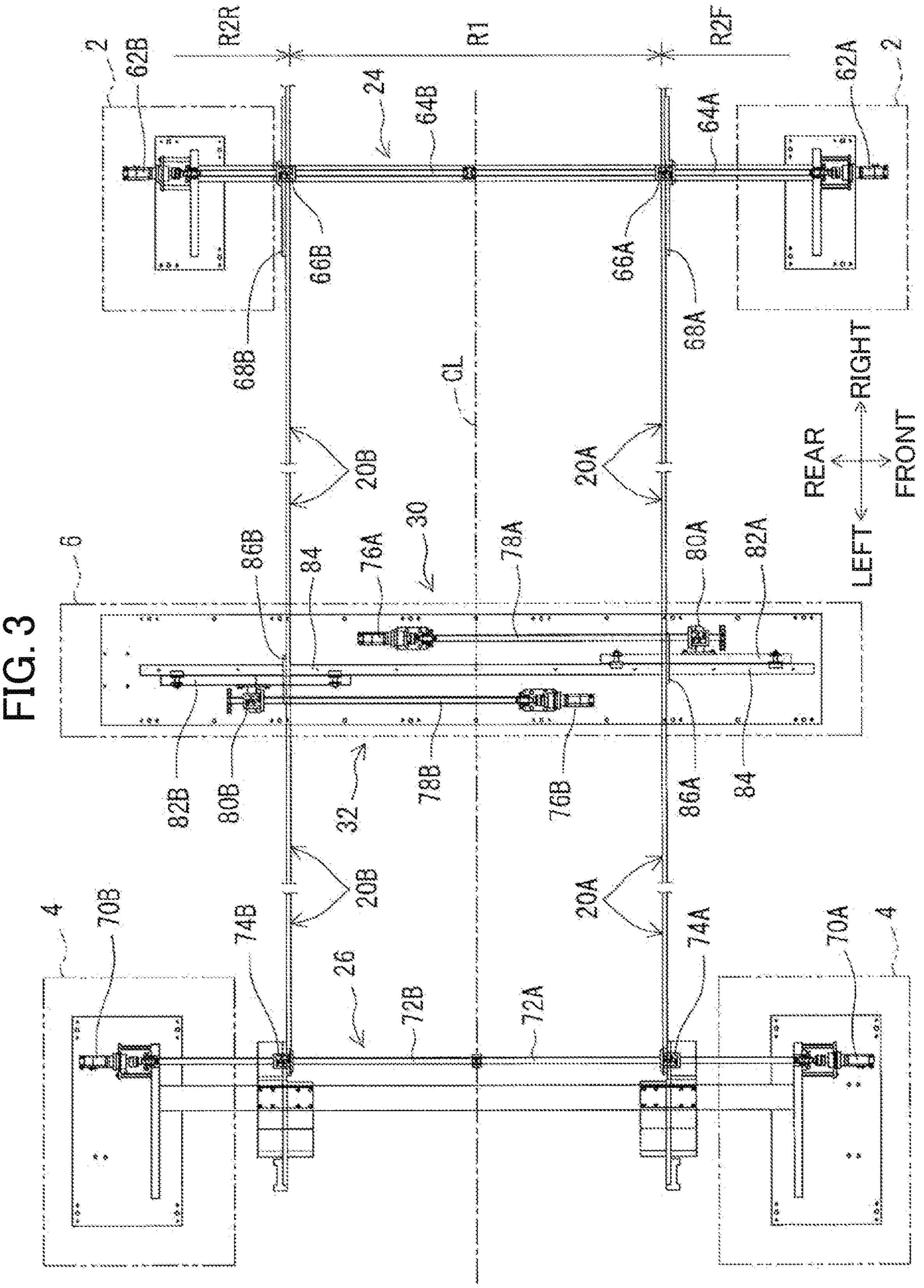
FIG. 3 is a top plan view showing a moving mechanism for moving upper support frames and lower support frames.

As shown in FIGS. 1 and 3, the folder-gluer 1 comprises a pair of upper support frames 20A, 20B, and a pair of lower support frames 22A, 22B. In the description of the DESCRIPTION, with regard to a pair of members arranged side-by-side in the front-rear direction, "A" is added to a reference sign of one member disposed forward of the other member, and "B" is added to a reference sign of the other member disposed rearward of the one member. Specifically, in the first embodiment, with regard to the pair of upper support members 20A, 20B arranged side-by-side in the front-rear direction, a forward one is the upper support member 20A, and a rearward one is the upper support member 20B, as shown in FIG. 3.

The upper support frames 20A, 20B are provided to extend over the overall length of the folder-gluer 1 from an inlet-side portion (right end in FIG. 1) of the folder-gluer 1 to an outlet-side portion (left end in FIG. 1) of the folder-gluer 1. On the other hand, the lower support frames 22A, 22B are provided to extend from the inlet-side portion of the folder-gluer 1 to the position of the intermediate holding member 6. The upper support frames 20A, 20B and the lower support frames 22A, 22B are configured to be movable in the width direction WD to change their positions depending on the length of the corrugated paperboard sheet SS in the width direction WD. The inlet-side holding member 2 and the outlet-side holding member 4 are provided, respectively, with an inlet-side moving mechanism 24 and an outlet-side moving mechanism 26 for moving the upper support frames 20A, 20B in the width direction WD. The inlet-side holding member 2 is also provided with an inlet-side moving mechanism 28 for moving the lower support frames 22A, 22B in the width direction WD. Further, two intermediate moving mechanisms 30, 32 are provided on the installation surface at respective positions adjacent to the intermediate holding member 6 to move the upper support frames 20A, 20B and the lower support frames 22A, 22B in the width direction WD.

The folder-gluer 1 comprises a pair of upper conveyor belts 40A, 40B each provided to extend in the right-left direction and in a direction parallel to the conveyance path PL, in a tensioned state. Each of the upper conveyor belts 40A, 40B is supported by a respective one of the upper support frames 20A, 20B, and disposed parallel to the conveyance path PL to extend over the overall length of the folder-gluer 1. In the first embodiment, the upper conveyor belts 40A, 40B are suction-type conveyor belts configured to convey the corrugated paperboard sheet SS in the conveyance direction PD while suction-holding an upper surface of the corrugated paperboard sheet SS, only in a region where the second bending station 12 is disposed. The upper conveyor belts 40A, 40B are configured to be driven by an upper conveyance motor 42 provided on the outlet side of the folder-gluer 1. The upper conveyance motor 42 has a rotary shaft to which a conveyance amount detector 44 for detecting a conveyance amount of the upper conveyor belts 40A, 40B is coupled. A distance between the upper conveyor belts 40A, 40B in the width direction WD is adjusted, depending on, e.g., a widthwise distance between the crease line PK2 and the crease line PK4 of the corrugated paperboard sheet SS.

The first bending station 10 comprises a pair of bending bars 46A, 46B arranged, respectively, on both sides of the conveyance path PL, and a pair of lower conveyor belts 48A, 48B configured to convey the corrugated paperboard sheet SS while supporting the corrugated paperboard sheet SS from therebelow. In the first embodiment, the bending bars 46A, 46B are mounted, respectively, to upper support frames 20A, 20B to extend from the position of the inlet-side holding member 2 to the position of the intermediate holding member 6. Each of the bending bars 46A, 46B has an upstream-side portion located above the conveyance path PL, and a downstream-side portion gradually inclined such that it is located below the conveyance path PL. The bending bars 46A, 46B are configured to come into contact, respectively, with the surfaces (upper surfaces in FIG. 1) of the first panel P1 and the fourth panel P4 and bend the first and fourth panels P1, P4 from the 0-degree position to the 90-degree position. The lower conveyor belts 48A, 48B are provided between the inlet-side portion of the folder-gluer 1 and the position of the intermediate holding member 6 in a tensioned state, and configured to be driven by a lower upper conveyance motor 50. The lower conveyor belts 48A, 48B are configured to convey the corrugated paperboard sheet SS in cooperation with the upper conveyor belts 40A, 40B. A conveyance assist device 49 and a guide device 51 for conveying the first panel P1 during glue application by the after-mentioned glue application device 14 are mounted to a position which is on the front side of the lower conveyance motor 50. The details of the conveyance assist device 49 and the guide device 51 will be described later.

Two bending plates (illustration is omitted) are mounted, respectively to the lower support frames 22A, 22B. Each of the bending plates comprises an edge member whose upper portion has a sharp distal edge, and is disposed such that the distal edge of the edge member thereof comes into contact with a respective one of the crease lines PK2, PK4 on the back side (under side) of the connection parts CN1, CN3. This makes it easy for the first panel P1 to be bent along the crease line PK2 (connection part CN1). This also makes it easy for the fourth panel P4 to be bent along the crease line PK4 (connection part CN3).

On both sides of the conveyance path PL in the width direction WD, the second bending station 12 comprises a pair of panel-bending belts 58A, 58B and a pair of guiding and regulating mechanisms 60A, 60B. A set of the panel-bending belt 58A and the guiding and regulating mechanisms 60A and a set of the panel-bending belt 58B and the guiding and regulating mechanisms 60B are supported, respectively, by the upper support frames 20A, 20B. In the first embodiment, the guiding and regulating mechanisms 60A, 60B comprise a plurality of heretofore-known gauge rolls. Specifically, the guiding and regulating mechanism 60A comprises two or more gauge rolls arranged side-by-side in the conveyance direction PD in alignment with the position of the connection part CN1. On the other hand, the guiding and regulating mechanism 60B comprises two or more gauge rolls arranged side-by-side in the conveyance direction PD in alignment with the position of the connection part CN3. The guiding and regulating mechanisms 60A, 60B are configured to guide, by the plurality of gauge rolls, the connection parts CN1, CN3 being bent.

Each of the panel-bending belts 58A, 58B is wound around a large number of rollers in a tensioned state, and disposed to extend over the overall length of the second bending station 12, such that a planar surface thereof can come into contact with a respective one of the surfaces of the first and fourth panels P1 and P4. The planar surface of each of the panel-bending belts 58A, 58B is positioned in a posturer where it extends along the up-down direction at an upstream end of the second bending station 12 in the conveyance direction PD, and is gradually inclined in a direction toward a downstream end of the second bending station 12 in the conveyance direction PD, whereafter it is finally positioned in a horizontal posture. The panel-bending belts 58A, 58B and the guiding and regulating mechanisms 60A, 60B are driven by a non-illustrated drive motor. The first and fourth panels P1, P4 of the corrugated paperboard sheet SS are guided and bent from the 90-degree position to the 180-degree position, respectively, by the panel-bending belts 58A, 58B, while the connection parts CN1, CN3 are guided, respectively, by the guiding and regulating mechanisms 60A, 60B. The panel-bending belts 58A, 58B are configured such that a distance therebetween in the width direction WD is adjustable depending on the distance between the crease lines PK2, PK4 of the corrugated paperboard sheet SS.

(Detailed Configuration of System for Moving Support Frames in Front-Rear Direction)

The folder-gluer 1 comprises the inlet-side moving mechanisms 24, 28, the outlet-side moving mechanism 26, and the intermediate moving mechanisms 30, 32, as a system for moving the upper support frames 20A, 20B and the lower support frames 22A, 22B in the front-rear direction (width direction WD). The one-dot chain line illustrated in FIG. 3 indicates a center line CN passing through a middle position of the folder-gluer 1 in the front-rear direction. A region R1 is a region between the upper support frames 20A, 20B arranged side-by-side in the front-rear direction. A region R2F is a region spreading forward of the region R1, and a region R2R is a region spreading rearward of the region R1. Example of a system employable to move the support frames such as the upper support frames 20A, 20B in the width direction WD may include the system disclosed in JP-B 5883747.

As shown in FIG. 3, the inlet-side moving mechanism 24 comprises a pair of servomotors 62A, 62B provided, respectively, on two areas of the inlet-side holding member 2 each lying in a respective one of the regions R2F, R2R, a pair of threaded shafts 64A, 64B, and a pair of nut members 66A, 66B. The servomotors 62A, 62B are coupled, respectively, to the threaded shafts 64A, 64B. Each of the threaded shafts 64A, 64B is disposed to extend from the respective positions of the servomotors 62A, 62B to the center line CN in the front-rear direction, and rotatably supported in the vicinity of the center line CN. The nut members 66A, 66B are threadingly engaged, respectively, with the threaded shafts 64A, 64B, and coupled to the upper support frames 20A, 20B through a pair of coupling members 68A, 68B, respectively. Thus, when the threaded shafts 64A, 64B are rotated independently according to rotational driving of the respective servomotors 62A, 62B, the nut members 66A, 66B are moved, respectively, on the threaded shafts 64A, 64B in the front-rear direction, so that upstream-side portions of the upper support frames 20A, 20B are moved in the front-rear direction.

The outlet-side moving mechanism 26 has a similar configuration to that of the inlet-side moving mechanism 24. Thus, description of the outlet-side moving mechanism 26 will be appropriately omitted. The outlet-side moving mechanism 26 comprises a pair of servomotors 70A, 70B, a pair of threaded shafts 72A, 72B coupled, respectively, to the servomotors 70A, 70B, and a pair of nut members 74A, 74B threadingly engaged, respectively with the threaded shafts 72A, 72B. When the threaded shafts 72A, 72B are rotated independently according to rotational driving of the respective servomotors 70A, 70B, the nut members 74A, 74B are moved in the front-rear direction, so that downstream-side portions of the upper support frames 20A, 20B coupled, respectively, to the nut members 74A, 74B are moved in the front-rear direction.

The intermediate moving mechanism 30 comprises a servomotor 76A, a threaded shaft 78A coupled to the servomotor 76A, and a nut member 80A threadingly engaged with the threaded shaft 78A. Similarly, the intermediate moving mechanism 32 comprises a servomotor 76B, a threaded shaft 78B coupled to the servomotor 76B, and a nut member 80B threadingly engaged with the threaded shaft 78B. The servomotors 76A, 76B are fixed to the installation surface to which the intermediate holding member 6 is fixed, and positioned in the region R1. The threaded shafts 78A, 78B are disposed to extend, respectively, from the positions of the servomotors 76A, 76B toward the upper support frames 20A, 20B in the right-left direction, and rotatably supported on the installation surface. The nut members 80A, 80B are threadingly engaged, respectively, with the threaded shafts 78A, 78B, and coupled, respectively, to two slide members 82A, 82B. A single guide rail 84 is disposed on the installation surface of the intermediate holding member 6 to extend in the front-rear direction. Each of the slide members 82A, 82B is configured to be slidable on the guide rail 84 in the front-rear direction. The slide members 82A, 82B are coupled to the upper support frames 20A, 20B through two coupling members 86A, 86B, respectively. When the threaded shafts 78A, 78B are rotated independently according to rotational driving of the respective servomotors 76A, 76B, the nut members 80A, 80B are moved in the front-rear direction, so that the slide members 82A, 82B are slid on the guide rail 84 in the front-rear direction. This allows intermediate portions of the upper support frames 20A, 20B to be moved in the front-rear direction.

As with the inlet-side moving mechanism 24, the inlet-side moving mechanism 28 comprises a pair of servomotors, a part of threaded shafts and a pair of nut members, although illustration thereof is omitted. The inlet-side moving mechanism 28 is configured to rotate the threaded shafts independently according to rotational driving of the respective servomotors to move the nut members on the respective threaded shafts in the front-rear direction, thereby moving upstream portions of the lower support frames 22A, 22B in the front-rear direction. The slide members 82A, 82B are also coupled to the lower support frames 22A, 22B through the coupling members 86A, 86B, respectively. Thus, when driving the servomotors 76A, 76B of the intermediate moving mechanisms 30, 32, the slide members 82A, 82B are slid on the guide rail 84 in the front-rear direction to move intermediate portions of the lower support frames 22A, 22B in the front-rear direction.

Figure 12:
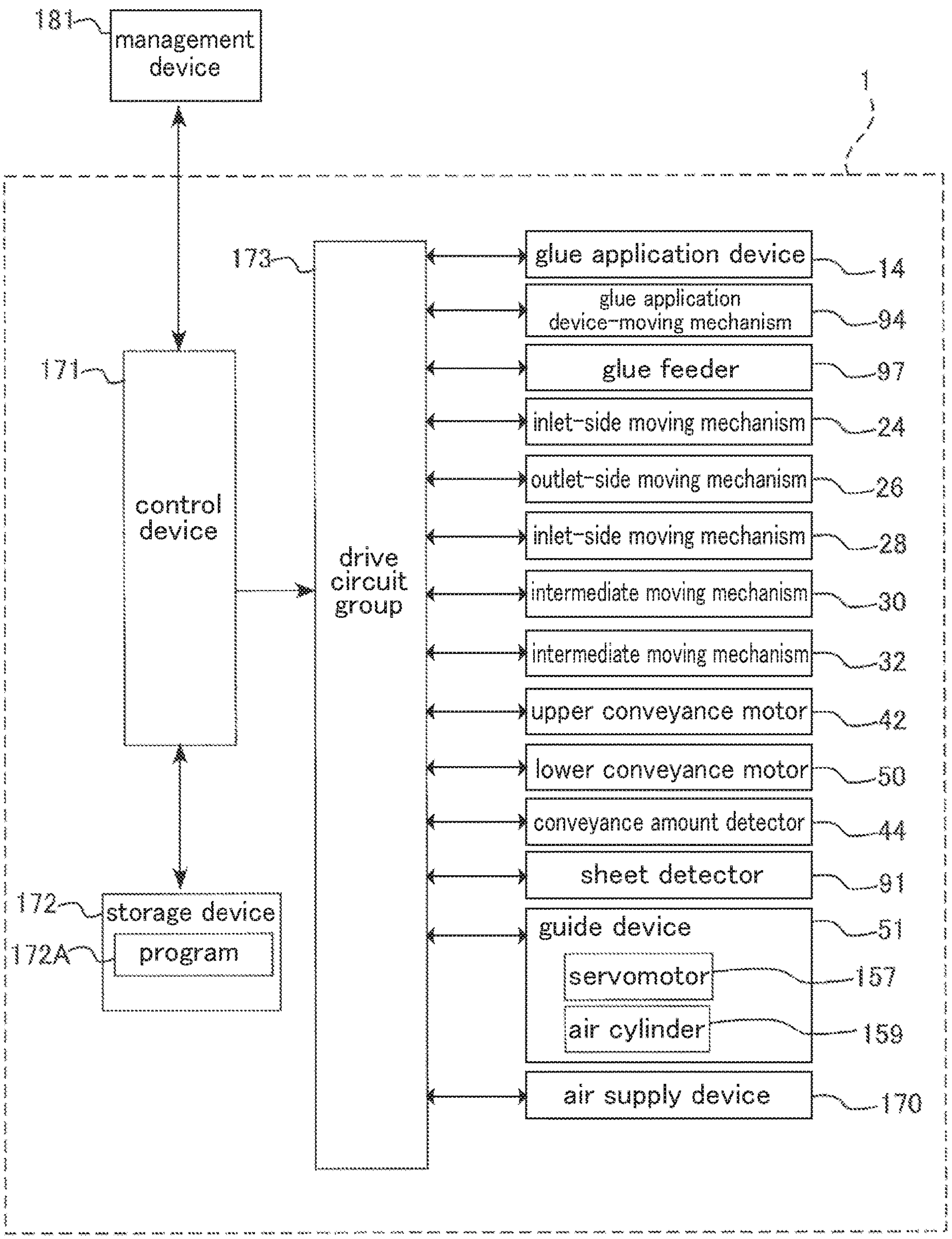
FIG. 12 is a block diagram showing an electrical configuration of the folder-gluer.

The folder-gluer 1 is also provided with a sheet detector 91 at a position upstream of the inlet-side holding member 2 (see FIG. 12). The sheet detector 91 is designed to detect (the leading edge FE or the like of) the corrugated paperboard sheet SS carried in the folder-gluer 1 from an upstream station. Examples of a detector employable as the sheet detector 91 may include a heretofore-known optical sensor comprising a light-emitting part and a light-receiving part. In the first embodiment, the sheet detector 91 is configured to output a low-level sheet detection signal to the after-mentioned control device 171 (see FIG. 12), when no corrugated paperboard sheet SS passes through the sheet detector 91 and thus light from the light-emitting part is not blocked or reflected. The sheet detector 91 is also configured to output a high-level sheet detection signal to the control device 171 when the corrugated paperboard sheet SS passes through the sheet detector 91 and thus light emitted from the light-emitting part is reflected by the leading edge FE of the corrugated paperboard sheet SS and received by the light-receiving part.

Figure 4:
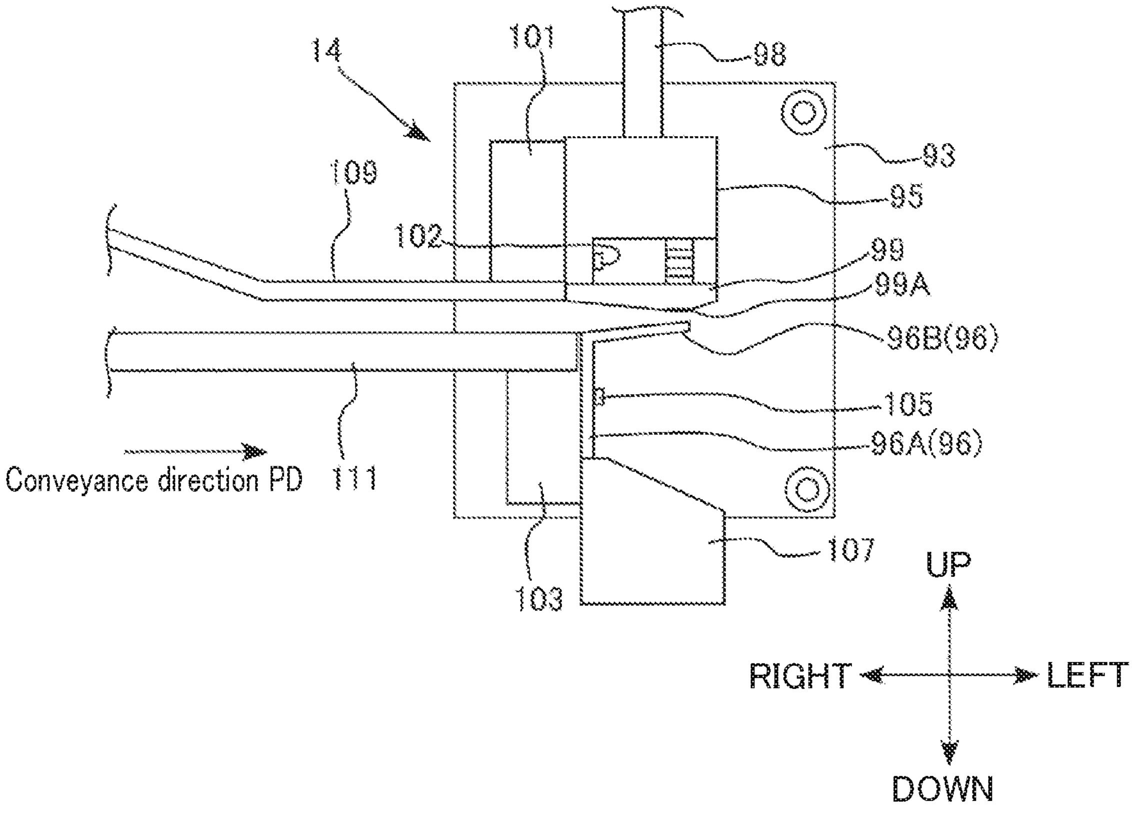
FIG. 4 is a schematic rear view of a glue application device.

The folder-gluer 1 further comprises a glue application device 14 for applying a glue to the gluing tab GS of the corrugated paperboard sheet SS. FIG. 4 is a schematic rear view of the glue application device 14. In the first embodiment, the glue application device 14 is disposed downstream of and adjacent to the inlet-side holding member 2. It should be noted that the glue application device 14 may be disposed within the inlet-side holding member 2, or may be disposed upstream of and adjacent to the inlet-side holding member 2.

The glue application device 14 comprises a support plate 93 mounted to a device body of the glue application device 14, a glue application device-moving mechanism 94 (see FIG. 12), a head 95, a sheet guide 96, and a glue feeder 97 (see FIG. 12). The support plate 93 is configured to be moved in the width direction WD by the glue application device-moving mechanism 94. The configuration of the glue application device-moving mechanism 94 is not particularly limited, but may be, e.g., a mechanism comprising a servomotor, a threaded shaft coupled to the servomotor and a nut member threadingly engaged with the threaded shaft, as with the inlet-side moving mechanism 24.

The head 95 is connected to the glue feeder 97 provided on the side of the device body of the glue application device 14 via a pipe 98 (hose, etc.), and configured to be supplied with the glue from the glue feeder 97. Glue is one example of the adhesive set forth in the appended claims. In the first embodiment, it is a polyvinyl acetate resin-based adhesive. The adhesive to be used in the present invention is not limited to a polyvinyl acetate resin-based adhesive, but may be, e.g., an adhesive obtained by dissolving a starch glue, etc., in water, an inorganic-based adhesive such as liquid glass consisting mainly of silicate soda or the like, or a synthetic adhesive obtained by dissolving polyvinyl alcohol, etc., in water. The head 95 is detachably mounted to a support member 101 fixed to the support plate 93, by a fastening member 102 such as a bolt. A nozzle 99 is mounted to a lower surface of the head 95. In the first embodiment, the nozzle 99 is composed of a member made from metal, and formed with a plurality of openings 99A for discharging the glue. In the first embodiment, the openings 99A are provided side-by-side in the width direction WD.

The sheet guide 96 is provided just below the nozzle 99 and the openings 99A. In the first embodiment, the sheet guide 96 is formed by bending a thin plate into a generally L shape. A first segment 96A of the generally L-shaped sheet guide 96 is detachably mounted to a support member 103 fixed to the support plate 93, by a fastening member 105 such as a bolt. A second segment 96B of the generally L-shaped sheet guide 96 which is not fixed by the fastening member 105 extends toward the openings 99A to slightly lean to the openings 99A. In a state in which the head 95 and the sheet guide 96 are mounted to the support plate 93, the openings 99A are opposed to a distal end of the second segment 96B. A receptacle member 107 is provided just below the second segment 96B to receive glue fallen from the second segment 96B.

An upper sheet guide 109 and a lower sheet guide 111 are provided upstream of the glue application device 14. The upper sheet guide 109 is disposed just above the lower sheet guide 111, and configured to guide the upper surface of the first panel P1 of the corrugated paperboard sheet SS conveyed from the upstream station, toward the glue application device 14. On the other hand, the lower sheet guide 111 is configured to guide a lower surface of the first panel P1 of the corrugated paperboard sheet SS conveyed from the upstream station, toward the glue application device 14. When the first panel P1 is guided by the upper and lower sheet guides 109, 111, the gluing tab GS of the corrugated paperboard sheet SS is guided between the openings 99A of the nozzle 99 and the second segment 96B of the sheet guide 96, and the glue is applied to the upper surface of the gluing tab GS. In the first embodiment, the head 95 is configured to apply the glue to the gluing tab GS while bringing the openings 99A into contact with the gluing tab GS. Thus, the head 95 is a contact-type glue gun. The head 95 is one example of the applicator device set forth in the appended claims.

Figure 5:
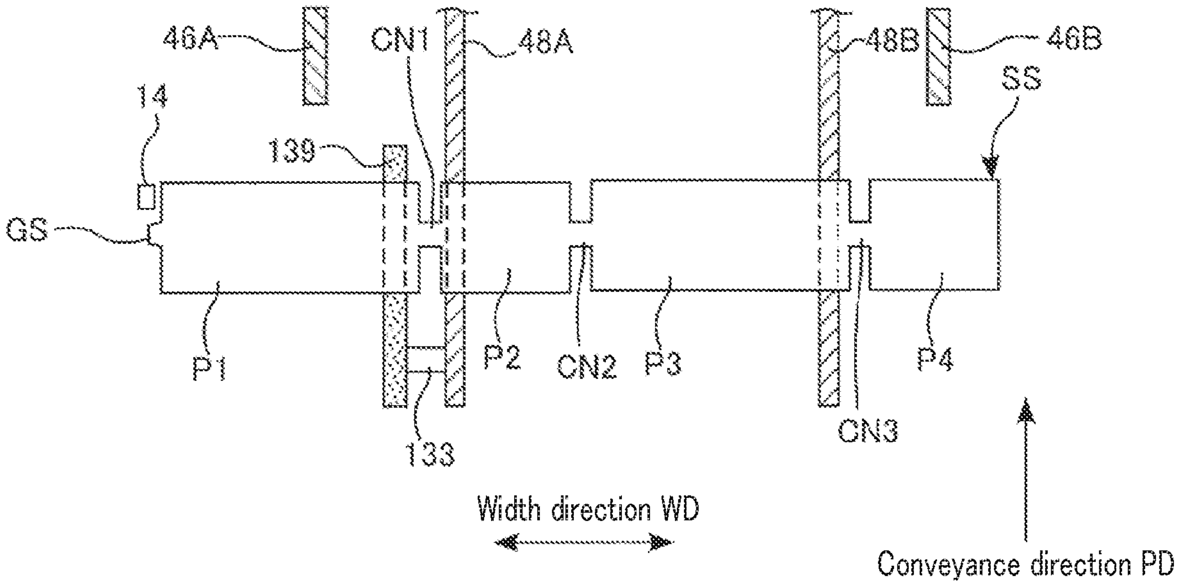
FIG. 5 is a schematic top plan view of the corrugated paperboard sheet, the glue application device, a conveyance assist device, and a first bending station.

When the corrugated paperboard sheet SS is carried out of the folder-gluer 1, the gluing tab GS with the glue applied thereto is glued or bonded to the fourth panel P4 by a non-illustrated joining roller. Further, the glue application device 14 is configured to allow the head 95 (openings 99A) and the sheet guide 96 (second segment 96B) to be move the position of the gluing tab GS in the width direction WD, in conjunction with the movement of the support plate 93 in the width direction WD by the glue application device-moving mechanism 94. That is, a glue discharge position (position where the glue is discharged from the openings 99A) can be adjusted to conform to the position of the gluing tab GS. FIG. 5 is a schematic top plan view of the corrugated paperboard sheet SS, the glue application device 14, the conveyance assist device 49 (after-mentioned lower belt 139), and the first bending station 10. As shown in FIG. 5, the glue application device 14 is provided at a position opposed to the lower belt 139 of the conveyance assist device 49 in the width direction WD. The glue application device 14 is also disposed at a position above the lower belt 139 across the corrugated paperboard sheet SS in the up-down direction. Thus, the glue application device 14 is disposed at a position above the lower belt 139 and offset relative to the lower belt 139 in a direction parallel to the width direction WD. In other words, in a case where the position of the glue application device 14 is set to be coincident with the position of the lower belt 139 in the width direction WD, the glue application device 14 is opposed to the lower belt 139 in the up-down direction.

In the first embodiment, the glue application device 14 is configured such that the positional relationship between the head 95 and the sheet guide 96 in the up-down direction can be reversed. In the configuration of the first embodiment, the fourth panel P4 is bent while following the operation of bending the first panel P1 to the 180-degree position, and superimposed on the outer side (glue application surface) of the gluing tab GS. Specifically, when the first panel P1 is bent by 180-degree through the first and second bending stations 10, 12 after applying the glue to the upper surface, i.e., glue application surface, of the gluing tab GS, the gluing tab GS is positioned to face downwardly, and joined with the lower surface (upward-facing surface after bending) of the fourth panel P4 which is bent followingly. That is, the folder-gluer 1 performs an inner gluing operation of gluing the gluing tab GS to the inner side of the fourth panel P4.

There are some cases where it is desired to perform an outer gluing operation of gluing or joining the gluing tab GS to the outer side of the fourth panel P4, e.g., in order to increase the volume of a corrugated paperboard box to be produced. In this case, for example, a user demounts the head 95 and the sheet guide 96 from the support plate 93, and reverses their up-down positions. The user also adjusts to allow the fourth panel P4 to be bent in advance of the first panel P1, e.g., by adjusting the second bending station 12. This allows the lower surface of the gluing tab GS before bending to be joined to the upper surface (downward-facing surface after bending) of the previously-bent fourth panel P4.

The gluing tab GS is one example of the to-be-bonded part set forth in the appended claims. The to-be-bonded part in the present invention is not limited to a portion protruding from the first panel P1, like the gluing tab GS. For example, as illustrated in FIG. 2, a to-be-bonded part GS1 may be provided in the fourth panel P4 devoid of the gluing tab GS, at a position corresponding to the gluing tab GS, i.e., at the corresponding position within the panel surrounded by the lines (score lines WK1, WK2 and crease line PK4), and the glue may be applied to the to-be-bonded part GS1. Then, after applying the glue to the to-be-bonded part GS1, the to-be-bonded part GS1 may be glued or bonded to the gluing tab GS to which no glue is applied.

Therefore, the folding panel in the present invention is not limited to the first panel P1, but may be the fourth panel P4. Further, the non-folding panel in the present invention is not limited to the second panel P2, but may be the third panel P3. Further, in a case where a corrugated paperboard sheet SS has four or more panels, any panel having a gluing tab GS or a surface provided with the to-be-bonded part GS1 may be referred to as "folding panel", and any panel which is connected to the folding panel and is not folded after glue application may be referred to as "non-folding panel".

(Conveyance Assist Device and Guide Device)

Figure 6:
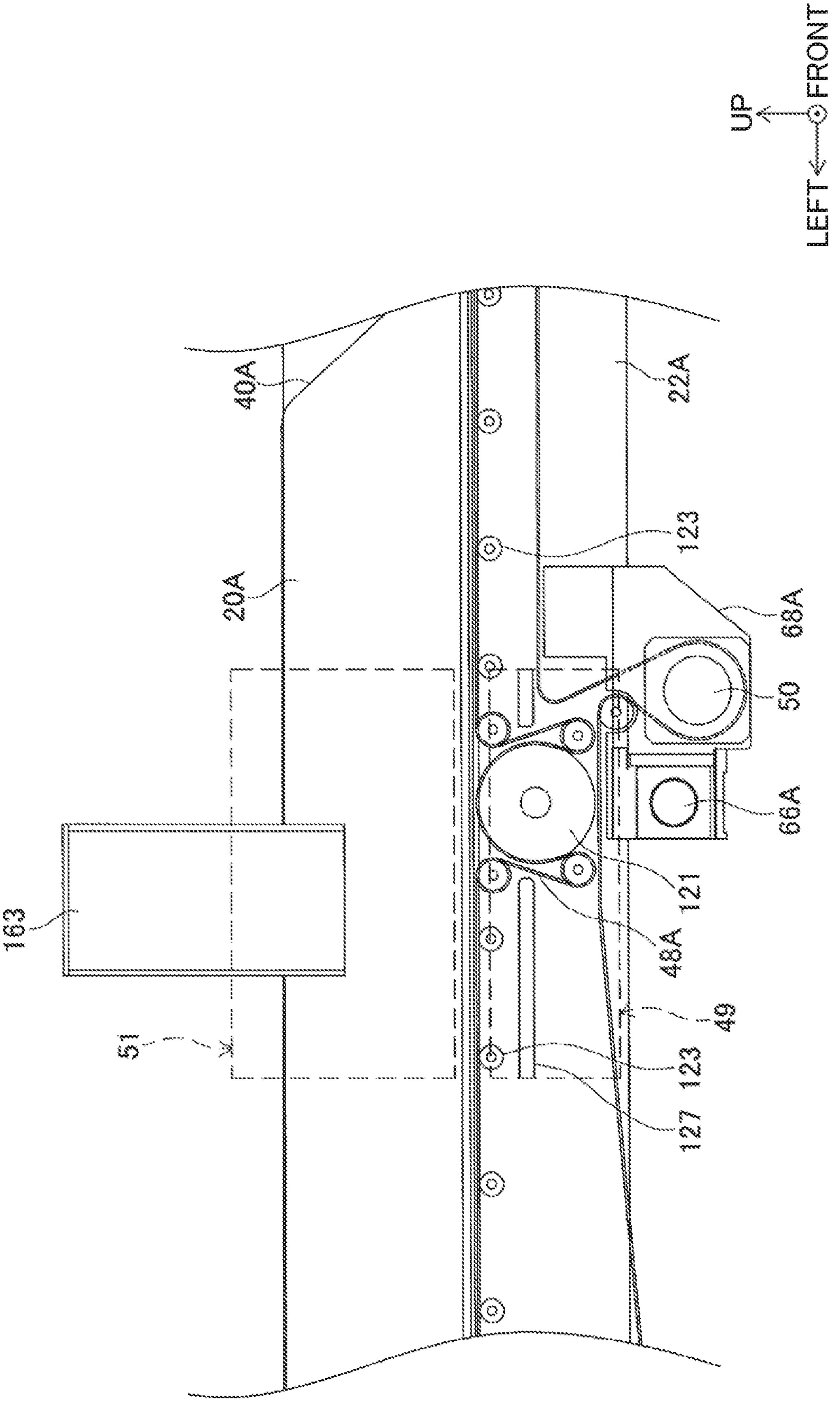
FIG. 6 is a front view of the upper support frame and the lower support frame.

FIG. 6 is a front view of the upper support frame 20A and the lower support frame 22A, and illustrates a mounting portion for the conveyance assist device 49 and the guide device 51. FIG. 6 illustrates front surfaces of the upper support frame 20A and the lower support frame 22A. In FIG. 6, respective mounting positions of the conveyance assist device 49 and the guide device 51 are indicated by broken lines.

As shown in FIG. 6, the coupling member 68A is mounted to a lower part of the front-side lower support frame 22A. The lower conveyance motor 50A is mounted to the coupling member 68A. The lower conveyor belt 48A is coupled to the lower conveyance motor 50A, and configured to be endlessly circulated based on driving of the lower conveyance motor 50. Further, a main pulley 121 is provided on the front surface of the lower support frame 22A. In the first embodiment, the main pulley 121 is composed of a pulley (annular member) made from metal, and rotatably mounted to the lower support frame 22A. The main pulley 121 is configured to be rotatable about a rotation axis parallel to the front-rear direction. As with the main pulley 121, each of the after-mentioned pulleys 123 is also configured to be rotatable about a rotation axis parallel to the front-rear direction. Each of the main pulley 121 and the after-mentioned pulleys 123 may be a member made from any other suitable material other than metal, such as resin. It is also to be understood that the size, shape, etc., of each of the pulleys are shown as an example.

The lower conveyor belt 48A is wound around an outer peripheral surface of the main pulley 121. Thus, when the lower conveyor belt 48A is endlessly circulated by the lower conveyance motor 50, the main pulley 121 is rotated together with the lower conveyor belt 48A. Therefore, the main pulley 121 is rotated along with rotation of the lower conveyance motor 50. A plurality of pulleys 123 are rotatably provided on the lower support frame 22A. In the first embodiment, each of the plurality of pulleys 123 has a diameter less than that of the main pulley 121, and the pulleys 123 are arranged side-by-side in the conveyance direction PD (right-to-left direction) along and below an upper edge of the lower support frame 22A. The lower conveyor belt 48A is wound around the main pulley 121 and the pulleys 123, and configured to be endlessly circulated along with rotation of the lower conveyance motor 50. The rear-side lower conveyor belt 48B is configured to be endlessly circulated along with rotation of the lower conveyance motor 50, as with the front-side lower conveyor belt 48A. In the first embodiment, the lower conveyor belt 48B is configured to be endlessly circulated at the same speed as that of the lower conveyor belt 48A to convey the corrugated paperboard sheet SS in the conveyance direction PD at the same speed as that of the lower conveyor belt 48A. The first bending station 10 may be configured to comprise two lower conveyance motor 50 for endlessly circulating the lower conveyor belts 48A, 48B, individually, may be configured to comprise a single lower conveyance motor 50 serving as a common drive source for the two belts.

Figure 7:
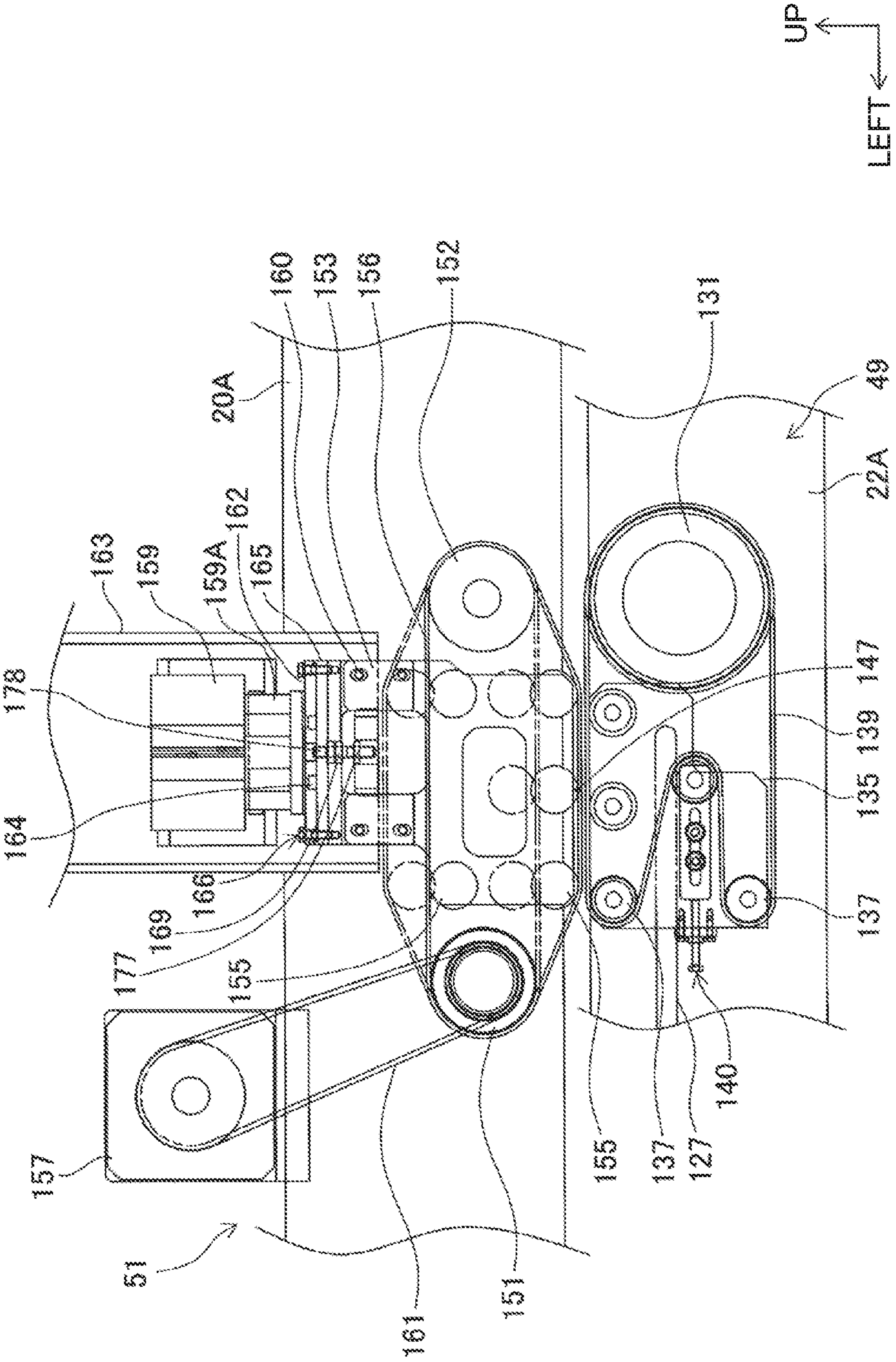
FIG. 7 is a front view of a guide device and the conveyance assist device.
Figure 8:
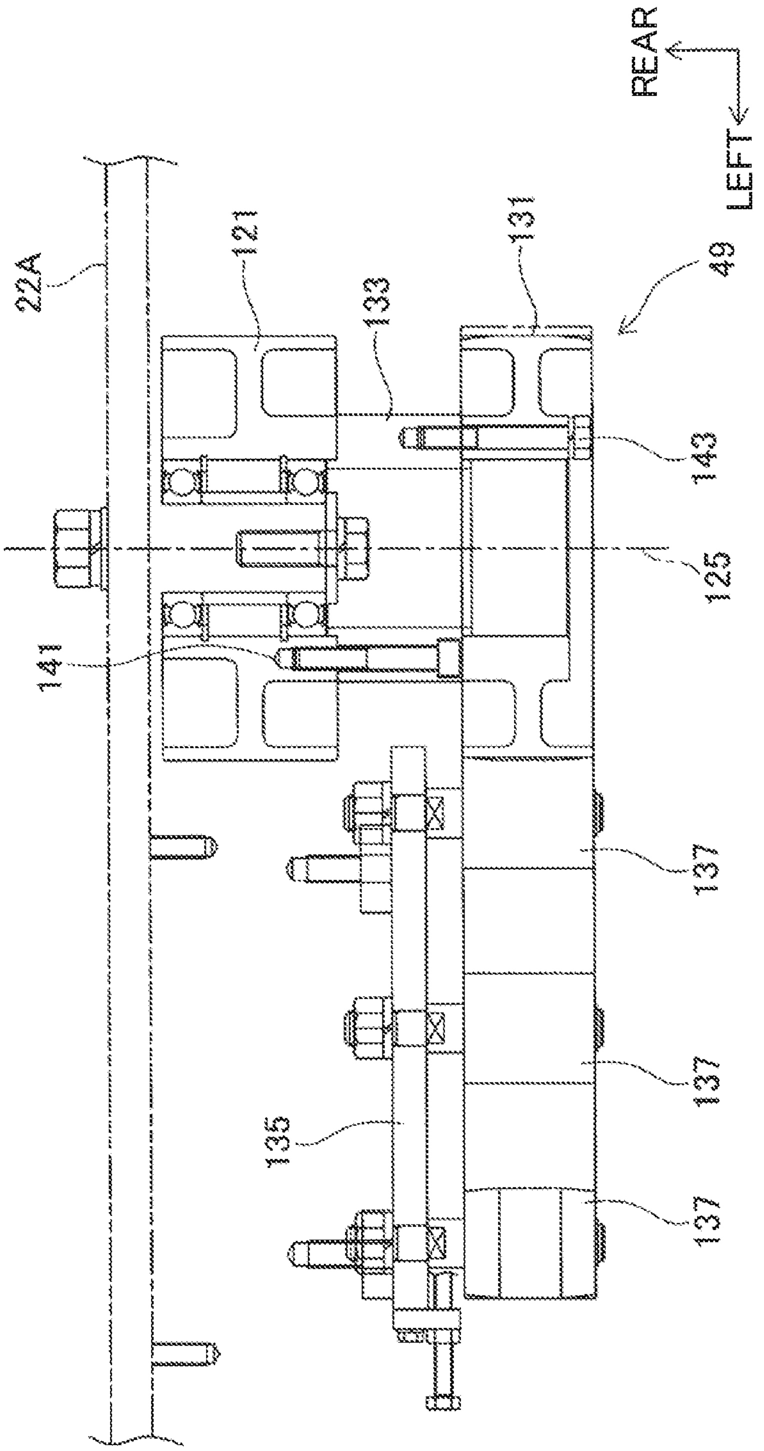
FIG. 8 is a top plan view of a main pulley of the conveyance assist device.
Figure 9:
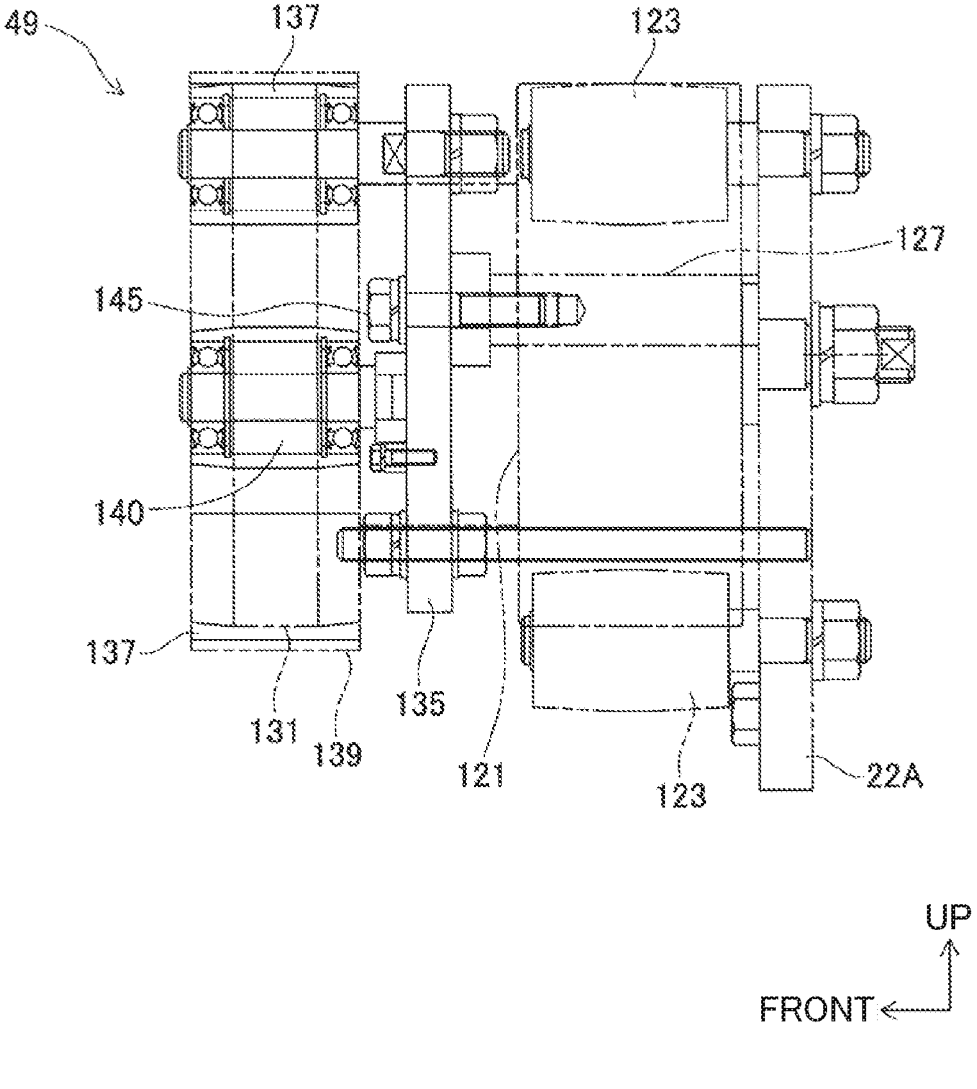
FIG. 9 is a side view of the conveyance assist device in FIG. 7, as viewed in the right-left direction.
Figure 10:
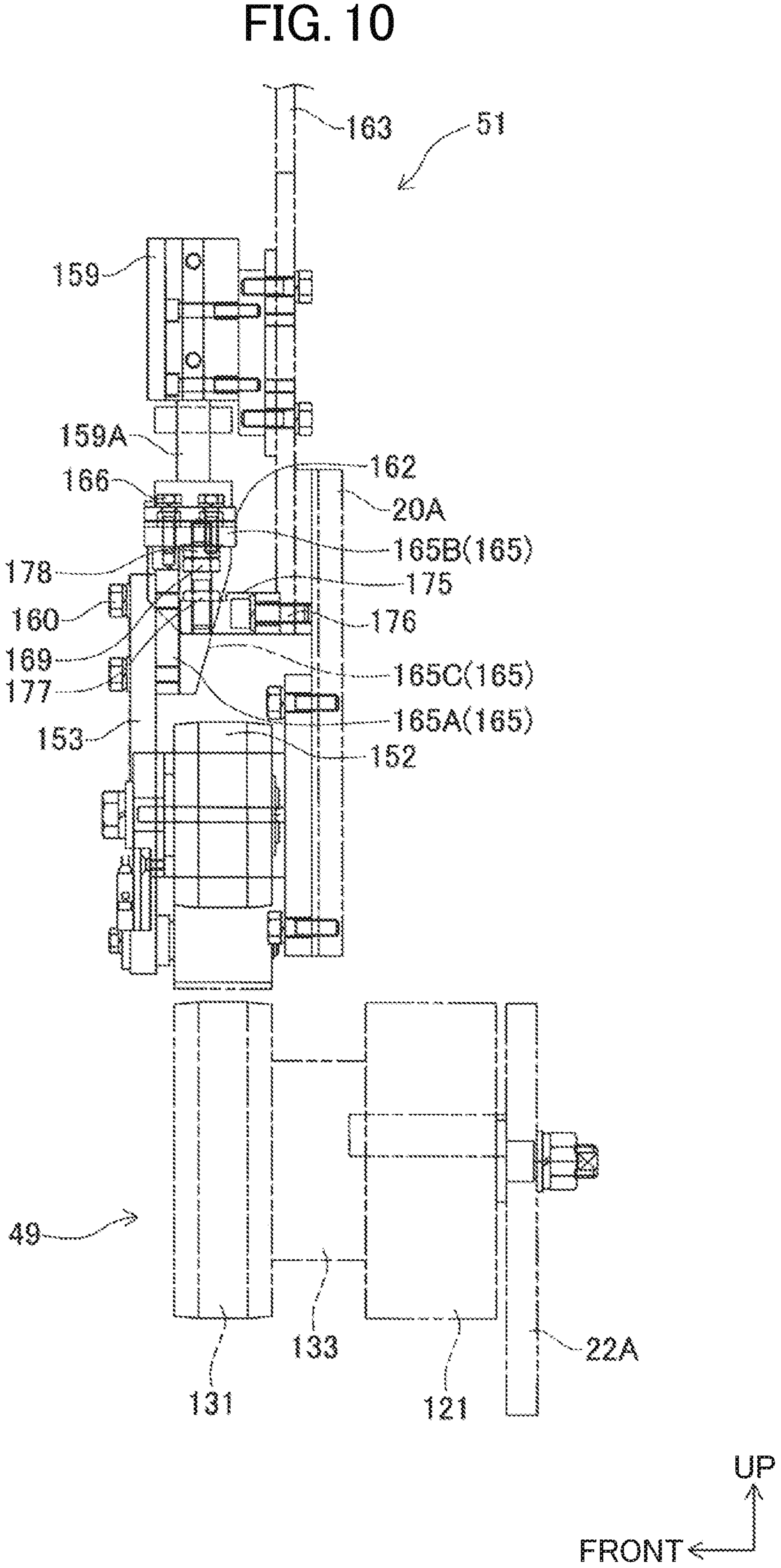
FIG. 10 is a side view of the guide device and the conveyance assist device in FIG. 7, as viewed in the right-left direction.

FIG. 7 is a front view of the conveyance assist device 49 and the guide device 51 each mounted in front of the main pulley 121. FIG. 8 is a top plan view of a coupling portion between the main pulley 121 and the conveyance assist device 49. FIG. 9 is a side view of the coupling portion in FIG. 7, and illustrates the conveyance assist device 49 as viewed in the right-left direction from the positions of the after-mentioned pulleys 137, and FIG. 10 illustrates the conveyance assist device 49 and the guide device 51 as viewed in the right-left direction from the position of the after-mentioned main pulley 152. In FIGS. 7 to 10 and the after-mentioned FIG. 11, some members are transparently illustrated. Further, in FIG. 7, the after-mentioned pulleys 155 and upper belt 156 disposed at the after-mentioned spaced-apart position 167 are indicated by two-dot chain lines.

As shown in FIGS. 7 to 10, the conveyance assist device 49 comprises a single main pulley 131, a collar 133, a plate 135, a plurality of pulleys 137, a lower belt 139, and a tension adjustment mechanism 140. In the first embodiment, the collar 133 is composed of an annular-shaped member made from metal, and formed to have a diameter less than that of the main pulleys 121, 131. The collar 133 is disposed rearward of the main pulley 131 and between the main pulley 131 and the main pulley 121. A fastening member 141 such as a bolt is inserted into the collar 133 to fix the collar 133 to a front surface of the main pulley 121 through the fastening member 141. A fastening member 143 such as a bolt is also inserted into the main pulley 131 to fix the main pulley 131 to a front surface of the collar 133 through the fastening member 143. The main pulley 131 is disposed at a position spaced apart from the main pulley 121 in the front-rear direction by the thickness of the collar 133. The main pulley 131 and the collar 133 each fixed to the main pulley 121 in the above manner can be rotated integrally together with the main pulley 121 about the same rotation axis as a rotation axis 125 of the main pulley 121. In the first embodiment, the main pulley 131 has the same diameter as that of the main pulley 121. However, it is to be understood that the radius of the main pulley 131 may be different from the radius of the main pulley 121.

In the first embodiment, the plate 135 is composed of a metal plate. As shown in FIG. 6, a raised part 127 is provided on the front surface of the lower support frame 22A to extend in the right-left direction. In the first embodiment, the raised part 127 is formed to protrude from the front surface of the lower support frame 22A to have a given thickness in the up-down direction, and extend along a direction parallel to the right-left direction. The plate 135 is fixed to a front surface of the raised portion 127 by a fastening member 145 (see FIG. 9). Each of the pulleys 137 is mounted to the plate 135, such that it is rotatable to with respect to the plate 135 about a rotation axis parallel to the front-rear direction. In the first embodiment, each of the pulleys 137 has a diameter less than that of the main pulley 131, and the pulleys 137 are provided such that three of them are arranged side-by-side in the right-left direction on an upper area of the plate 135, and the remaining one is disposed on a lower area of the plate 135. The lower belt 139 is wound around the main pulley 131 and the pulleys 137. Thus, when the main pulley 121 is rotated along with rotation of the lower conveyance motor 50, the lower belt 139 is endlessly circulated by a rotational driving force of the main pulley 121 transmitted via the main pulley 131. Among the four pulleys 137, the upper three pulleys 137 are arranged side-by-side parallel to the right-left direction. The lower belt 139 is configured to come into contact with the lower surface of the first panel P1 to convey the first panel P1, when it travels on the upper side of the three pulleys 137. In the first embodiment, the lower belt 139 is configured to be endlessly circulated at the same speed as that of the lower conveyor belt 48A to convey the first panel P1 in the conveyance direction PD at the same speed (which is one example of the first speed set forth in the appended claims) as that of the lower conveyor belt 48A. It should be noted here that the conveyance assist device 49 may comprise a speed change gear or the like, and is configured to endlessly circulate the lower belt 139 at a circulation speed different from that of the lower conveyor belt 48A.

The guide device 51 is disposed above the conveyance assist device 49 in the up-down direction. The conveyance assist device 49 and the guide device 51 are configured to convey the first panel P1 in the conveyance direction PD according to driving, while nipping the first panel P1 therebetween in the up-down direction. For example, in a nipping zone 147 where the first panel P1 is nipped, the lower belt 139 is tensioned in the right-left direction while allowing its planar surface to become parallel to the front-rear direction and the right-left direction, by the main pulley 131 and the upper three pulleys 137.

The tension adjustment mechanism 140 is designed to adjust a tension of the lower belt 139. In the first embodiment, the tension adjustment mechanism 140 comprises a pulley rotatable contacting the lower belt 139, and a frame supporting the pulley. For example, in a situation where it is necessary to adjust the tension of the lower belt 139 due to degradation thereof, the user adjusts the position of the frame of the tension adjustment mechanism 140 to adjust a force to be applied to the lower belt 139 from the pulley of the tension adjustment mechanism 140, thereby adjusting the tension of the lower belt 139.

Figure 11:
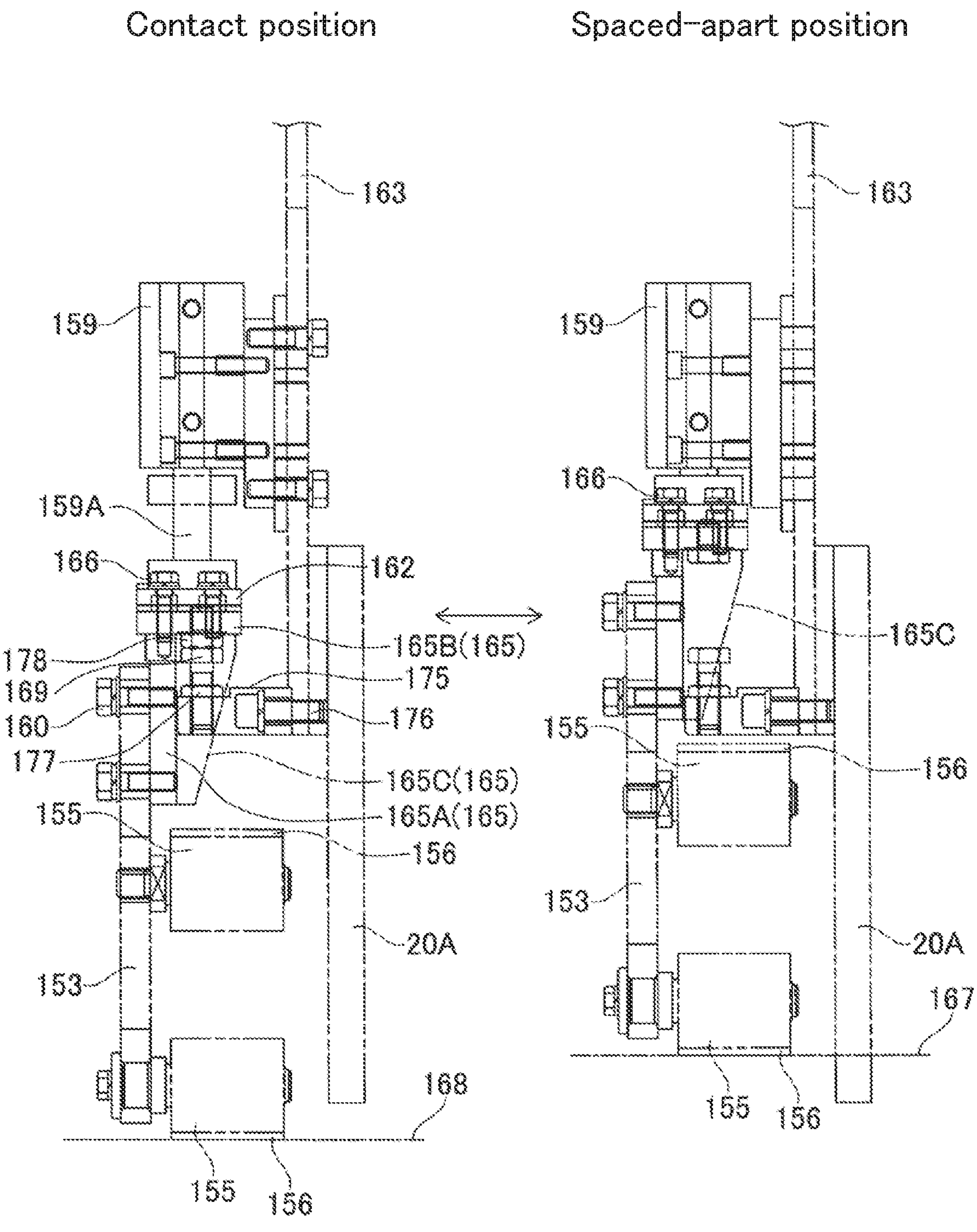
FIG. 11 is a side view of the guide device, as viewed in the right-left direction, wherein two states in which pulleys are at a contact position and at a spaced-apart position are illustrated.

The guide device 51 is disposed at a position opposed to the conveyance assist device 49 in the up-down direction. The guide device 51 comprises a pair of main pulleys 151, 152, a plate 153, a plurality of pulleys 155, an upper belt 156, a servomotor 157, and an air cylinder 159. FIG. 11 is a side view of the guide device 51, as viewed in the right-left direction, wherein two states in which the pulleys 155 are at a contact position and at a spaced-apart position are illustrated.

In the first embodiment, as shown in FIGS. 7, 10 and 11, the main pulley 152 has the same shape as that of the main pulley 151, and disposed rightward (upstream) of the main pulley 151 in the right-left direction. Each of the main pulleys 151, 152 is mounted to the upper support frame 20A, such that it is disposed forward of the upper support frame 20A, and is rotatable with respect to the upper support frame 20A about a rotational axis parallel to the front-rear direction.

In the first embodiment, the plate 153 is composed of a metal plate to which the plurality of (in the first embodiment, five) pulleys 155 are mounted. Each of the pulleys 155 is mounted to a back surface (rear surface) of the plate 153, such that it is rotatable with respect to the plate 153 about a rotational axis parallel to the front-rear direction. The pulleys 155 are arranged between the main pulleys 151, 152 in the right-left direction. In the first embodiment, two of the five pulleys 155 are provided on an upper area of the plate 153, and the remaining three pulleys 155 are provided on a lower area of the plate 153, wherein each of the upper and lower sets of pulleys 155 are arranged side-by-side in the right-left direction. The upper belt 156 is wound around the pair of main pulleys 151, 152 and the five pulleys 155.

The servomotor 157 is coupled to the left main pulley 151. An output shaft of the servomotor 157 is coupled to a rotary shaft of the main pulley 151 through a timing belt 161. Thus, a rotational driving force of the servomotor 157 is transmitted to the upper belt 156 through the timing belt 161 and the main pulley 151 to endlessly circulate the upper belt 156 according to rotation of the servomotor 157. In the first embodiment, the lower belt 139 is configured to be rotated about the rotational axis along a direction orthogonal to the drawing sheet of FIG. 7 in a counterclockwise direction, based on driving of the lower conveyance motor 50, and the upper belt 156 is configured to be endlessly circulated in a clockwise direction. Further, the servomotor 157 is configured to be rotated at a given rotation speed based on the after-mentioned control of the control device 171 (see FIG. 12) of the folder-gluer 1. In the first embodiment, the control device 171 is configured to control the rotation speed of the servomotor 157 to allow the upper belt 156 to be endlessly circulated at the same speed as that of the lower belt 139.

The air cylinder 159 is provided to an upper part of the plate 153. In the first embodiment, the air cylinder 159 is fixed to a plate 163 provided on an upper area of the front surface of the upper support frame 20A. The air cylinder 159 comprises a cylinder body provided with a cylinder part, and an output rod 159A, wherein the air cylinder 159 is mounted to the plate 163 with the cylinder body fixed to the plate 163 and with the output rod 159A protruding downwardly. The output rod 159 is movable in the up-down direction based on driving of the air cylinder 159.

A bracket 165 is mounted to the upper part of the plate 153. The bracket 165 is fixed to the rear side of the plate 153. In the first embodiment, the bracket 165 is composed of a metal plate-shaped member, and formed into a generally L shape as viewed in the right-left direction. A lower segment 165A of the bracket 165 (see FIG. 10) has a planar front surface facing forwardly and extending parallel to the up-down direction and the right-left direction. The plate 153 is fixed to the front surface of the lower segment 165A by a plurality of bolts 160. An upper segment 165B of the bracket 165 has a planar upper surface facing upwardly and extending parallel to the right-left direction and the front-rear direction. A plate-shaped coupling plate 162 is mounted to a lower end (distal end) of the output rod 159A. The coupling plate 162 is fixed to a lower surface of the output rod 159A by a plurality of cap bolts 164 in a posture parallel to the right-left direction and the front-rear direction. The coupling plate 162 is also fixed to an upper surface of the upper segment 165B by a plurality of bolts 166. Thus, the plate 153 is mounted to the output rod 159A through the bracket 165 and the coupling plate 162. When the plate 153 is moved in the up-down direction based on driving of the air cylinder 158, the pulleys 155 are moved in the up-down direction along with the movement of the plate 153. According to the movement of the pullets 155, the upper belt 156 is displaced while being pulled by the pulleys 155. The bracket 165 has a pair of reinforcement ribs 165C provided inside a rectangular space defined by the L shape thereof. Each of the reinforcement ribs 165C connects a back surface of the lower segment 165A and a lower surface of the upper segment 165B. The above connection structure between the output rod 159A and the plate 153 is shown as an example. For example, the bracket 165 or the plate 153 may be directly fixed to the lower surface of the output rod 159A.

In the first embodiment, the folder-gluer 1 comprises an air supply device 170 (see FIG. 12) for supplying air to the air cylinder 159. The control device 171 of the folder-gluer 1 is configured to control the air supply device 170 to selectively supply air at a first fluid pressure (which is one example of the first fluid pressure in the appended claims) and air at a second fluid pressure (which is one example of the second fluid pressure in the appended claims) to the air cylinder 159. The air cylinder 159 is controlled to raise the output rod 159A and the bracket 165 (plate 153) to a spaced-apart position 167, when air at the first fluid pressure is supplied to the inside of the cylinder part. Along with the rising of the plate 153, the upper belt 156 is partly raised while being pulled by the pulleys 155 (see the two-dot chain line in FIG. 7). That is, the control device 171 is operable to supply the first fluid pressure to the air cylinder 159, thereby disposing the upper belt 156 at the spaced-apart position 167 where a part of the upper belt 156 is raised (see the right figure in FIG. 11). When the upper belt 156 is disposed at the spaced-apart position 167, a lowermost surface of the upper belt 156 is raised to a position spaced apart from the upper surface of the first panel P1 being conveyed. In this state, even if the upper belt 156 is endlessly circulated based on driving of the servomotor 157, the upper belt 156 does not contact the first panel P1, so that it does not apply any conveyance force to the corrugated paperboard sheet SS.

The control device 171 is also operable to supply air at the second fluid pressure to the air cylinder 159, thereby lowering the output rod 159A and the bracket 165 (plate 153) to a contact position 168. Along with the lowering of the plate 153, the pulleys 155 are lowered. Along with the lowering of the plate 153, the upper belt 156 is lowered while being pulled by the pulleys 155. Finally, the upper belt 156 is disposed at the contact position 168 where the lowermost surface thereof contacts the upper surface of the first panel P1. In the first embodiment, when the upper belt 156 is disposed at the contact position 168, it is tensioned in a direction parallel to the right-left direction while allowing the planar surface thereof to extend parallel to the front-rear direction and the right-left direction, in the nipping zone 147 where the first panel P1 is nipped. That is, the upper belt 156 is tensioned in a posture where the planar surface thereof is parallel to the lower belt 139. When the upper belt 156 is disposed at the contact position 168, the lowermost surface thereof is disposed with a slight gap with respect to an uppermost surface of the lower belt 139 in the up-down direction. The first panel P1 of the corrugated paperboard sheet SS is inserted into this gap, and conveyed in the conveyance direction PD while being nipped between the upper belt 156 and the lower belt 139.

During the period during which the second air pressure is supplied to the air cylinder 159, the air cylinder 159 is controlled to urge the plate 153 upwardly by a given urging force while disposing the plate 153 at the contact position 168. This given urging force has a magnitude cancelling out a force which is applied from the guide device 51 to the first panel P1 due to the weight of the guide device 51. More specifically, a force urging the output rod 159A upwardly when air at the second air pressure is supplied to the air cylinder 159 has a magnitude capable of compensating for a difference between a total value of the gravity acting on the members (the bracket 165, the plate 153, the pulleys 155 and the upper belt 156) connected to (suspended from) the output rod 159A and a force of an upward component of a tension received by the plate 153 from the upper belt 156, i.e., compensating for an insufficient amount as an upward force. In this way, the guide device 51 is urged upwardly by the air cylinder 159, so that, for example, upward and downward forces acting on the plates 153 are balanced out, and the guide device 51 is disposed as if it were floated at the contact position 168. The above magnitude of the force for urging the output rod 159A upwardly by the second air pressure is shown as an example. For example, the force for urging the output rod 159A may have a magnitude less than the difference between the total value of the gravity acting on the members connected to the output rod 159A and the force of the upward component of the tension received by the plate 153 from the upper belt 156.

In the first embodiment, the gap between the lowermost surface of the upper belt 156 disposed at the contact position 168 and the uppermost surface of the lower belt 139 is set in conformity to a corrugated paperboard sheet SS having a thinnest thickness (thinnest corrugated paperboard sheet SS), among plural types of corrugated paperboard sheets SS manufacturable by a corrugated paperboard box making machine equipped with the folder-gluer 1. Conceivable examples of the thickness of the thinnest corrugated paperboard sheet SS include 0.5 mm, 1.5 mm and 3 mm. This allows the upper belt 156 to be contact and convey the first panel P1 even when the thinnest corrugated paperboard sheet SS is conveyed. Further, when a corrugated paperboard sheet SS thicker than the thinnest corrugated paperboard sheet SS is conveyed, the upper belt 156 is raised while contacting the first panel P1, because the weight of the guide device 51 is cancelled out by the air cylinder 159. Specifically, the upper belt 156 is raised up to a height according to the thickness of the first panel P1, while being pushed upwardly by the first panel P1, and conveys the first panel P1 while contacting the first panel P1. This allows the upper belt 156 to come into contact with the upper surface of the first panel P1 in a good manner to convey the first panel P1, regardless of the thickness of a corrugated paperboard sheet SS to be conveyed. It should be noted that the upper belt 156 at the contact position may be disposed in contact with the lower belt 139 by eliminating the gap between the lowermost surface of the upper belt 156 and the uppermost surface of the lower belt 139.

The guide device 51 further comprises a stopper 169 for restricting a downward movement of the plate 153 and the bracket 165. Specifically, as shown in FIGS. 7 and 10, a block 175 is mounted to the front surfaces of the upper support frame 20A and the plate 163. The block 175 is fixed to an overlapping portion between the upper support frame 20A and the plate 163 by a bolt 176, in a posture where it protrudes forwardly from the overlapping portion. The block 175 extends such that a front end thereof reaches a position adjacent to the back surface of the lower segment 165A of the bracket 165. A thread-engagement counterpart member 177 with which the stopper 169 is threadingly engaged is mounted to the front end of the block 175. In the first embodiment, the thread-engagement counterpart member 177 is composed of a nut which is mounted to the block 175 in a posture where an insertion hole thereof extends along the up-down direction. In the first embodiment, the stopper 169 is composed of a bolt which is threadingly engaged with the thread-engagement counterpart member 177 from thereabove. The stopper 169 is threadingly engaged with the thread-engagement counterpart member 177 and mounted to the block 175 in a posture where it protrudes upwardly from the block 175. The stopper 169 is configured such that a protruding length by which the stopper 169 protrudes upwardly from the block 175 is adjustable depending on a thread-engagement position of the stopper 169 with respect to the thread-engagement counterpart member 177. It is to be understood that the thread-engagement counterpart member 177 is not limited to a nut, but may be an internally threaded hole, and the stopper 169 is not limited to a bolt, but may be any other suitable externally threaded member such as a screw.

A protective member 178 is mounted to the upper segment 165B. In the first embodiment, the protective member 178 is composed of a bolt which is provided in the middle of the upper segment 165B in the right-left direction and threadingly driven into the upper segment 165B from therebelow. The stopper 169 is disposed at a position below the protective member 178 and opposed to the protective member 178 in the up-down direction. Thus, along with downward movement of the coupling plate 162 and the bracket 165 caused by downward stretching of the output rod 159A, the protective member 178 is moved downwardly and brought into contact with the stopper 169. The stopper 169 supports the protective member 178 from therebelow to restrict the downward movement of the bracket 165. For example, when the pressure of the air cylinder 159 is changed from the first air pressure to the second pressure, the output rod 159A is moved downwardly according to the tension of the upper belt 156, etc. The bracket 165 is moved downwardly along with the downward movement of the output rod 159A, and restricted in terms of its downward movement by the stopper 169, so that it is disposed at the contact position 168. In other words, the user can adjust the contact position 168 in the up-down direction by adjusting the protruding amount (thread-engagement position) of the stopper 169. Further, the occurrence of deformation, etc., of the bracket 165 due to contact of the stopper 169 can be suppressed by providing the protective member 178 on the bracket 165 so as to allow the stopper 169 to come into contact with the protective member 178. In the event of deformation of the protective member 178, the deformed protective member 178 can be demounted from the bracket 165 and replaced with a new one. The above configuration of the stopper 169 is shown as an example. For example, the guide device 51 may have a configuration devoid of the protective member 178. In this case, the movement of the bracket 165 may be restricted by allowing the stopper 169 to come into direct contact with the bracket 165. Further, each of the stopper 169 and the protective member 178 is not limited to being composed of a metal member, but may be composed of a member partly or entirely formed of an elastic material.

The air cylinder 159 is one example of the fluid pressure cylinder or moving device set forth in the appended claims. The fluid pressure cylinder used in the present invention is not limited to an air cylinder, but may be, e.g., a hydraulic cylinder. Further, the moving device for selectively moving the upper belt 156 to the contact position 168 and the spaced-apart position 167 is not limited to a fluid pressure cylinder. For example, the moving device may be a ball screw mechanism comprising a servomotor, a threaded shaft, and a nut, as in the inlet-side moving mechanism 24. Alternatively, the moving device may be an actuator configured to move a rack according to driving of a motor, or may be a cam mechanism using an eccentric cam to convert an output of a motor into a force for moving the plate 153 in the up-down direction. Alternatively, the moving device may be composed of a combination of at least one of the above-mentioned ball screw mechanism, actuator and eccentric cam, and the urging mechanism using the air cylinder 159.

In the first embodiment, as illustrated in FIG. 5, the lower conveyor belt 48A is configured to convey the second panel P2 in the conveyance direction PD while contacting the lower surface of the second panel P2 at a position adjacent to the connection part CN1 of the corrugated paperboard sheet SS. Further, the lower conveyor belt 48B is configured to convey the third panel P3 in the conveyance direction PD while contacting the lower surface of the third panel P3 at a position adjacent to the connection part CN3. The lower belt 139 of the conveyance assist device 49 is configured to convey the first panel P1 in the conveyance direction PD while contacting the lower surface of the first panel P1 at a position adjacent to the connection part CN1. The upper belt 156 of the guide device 51 is disposed just above the lower belt 139, and configured to convey the first panel P1 in the conveyance direction PD while nipping the first panel P1 in cooperation with the lower belt 139 (see FIG. 7). The lower belt 139 is disposed at a position spaced apart from the lower conveyor belt 48A in the width direction WD by a distance corresponding to the thickness of the collar 133. The connection part CN1 of the corrugated paperboard sheet SS is conveyed the conveyance direction PD just above the collar 133. That is, the lower belt 139 and the lower conveyor belt 48A are disposed at respective positions which are adjacent to each other and between which the connection part CN1 is sandwiched in the width direction WD. The positions of the lower belt 139 and the lower conveyor belt 48A are adjusted depending on the length of the corrugated paperboard sheet SS in the width direction WD, by driving the inlet-side moving mechanism 24, etc. The lower belt 139 is partly disposed on a straight line which extends parallel to the width direction WD and passes through the glue application device 14. Thus, the glue application device 14 is disposed in a range extending in the conveyance direction PD between a position where the corrugated paperboard sheet SS is loaded on the lower belt 139 and a position where the corrugated paperboard sheet SS is unloaded from the lower belt 139. As one alternative configuration, the glue application device 14 may be disposed downstream in the conveyance direction PD of the position where the corrugated paperboard sheet SS is unloaded from the lower belt 139. For example, the lower belt 139 may be disposed at a position where it can convey the first panel P1 in the conveyance direction PD, while contacting a portion of the first panel P1 located upstream of the gluing tab GS, during the period during which the glue is applied to the gluing tab GS by the glue application device 14. As another alternative configuration, the glue application device 14 may be disposed upstream in the conveyance direction PD of the position where the corrugated paperboard sheet SS is loaded on the lower belt 139. For example, the glue application device 14 may be disposed upstream of the loading position of the lower belt 139, and the lower belt 139 may be disposed a position where it contacts a portion of the first panel P1 located downstream of the gluing position GS, before the glue application device 14 contacts the gluing tab GS. Further, the lower belt 139 may be disposed at a position where it can convey the first panel P1 in the conveyance direction PD while contacting a portion of the first panel P1 located downstream of the gluing tab GS, during the period during which the glue is applied to the gluing tab GS by the glue application device 14. In the above two configurations, the corrugated paperboard sheet SS is preferably configured such that the moment of inertia of area depending on the length in the conveyance direction PD of a portion of the first panel P1 with which the lower belt 139 is in contact is relatively large, and therefore the first panel P1 is less likely to bend even when it is subjected to resistance due to glue application by the glue application device 14. That is, the corrugated paperboard sheet SS preferably has rigidity enough to, even in a situation where only a part of the first panel P1 is conveyed by the lower belt 139, and glue application is performed by the glue application device 14, prevent the first panel P1 from bending due to resistance caused by the glue application.

(Electrical Configuration of Folder-Gluer)

FIG. 12 is a block diagram showing an electrical configuration of the folder-gluer 1. In addition to the aforementioned components, the folder-gluer 1 comprises a control device 171, a storage device 172, and a drive circuit group 173. In the first embodiment, the control device 171 is composed of a computer comprising a CPU as a main component, and designed to comprehensively control the folder-gluer 1. In the first embodiment, the storage device 172 includes RAM, ROM and HDD, and configured to store therein various types of data relating to the folder-gluer 1. The control device 171 is configured to execute a program 172A stored in the storage device 172, on the CPU, to control operations of the folder-gluer 1. The drive circuit group 173 is connected to each of the components such as the glue application device 14, and the glue application device-moving mechanism 94. The drive circuit group 173 is composed of a plurality of drive circuits for controllably driving various components of the folder-gluer 1, and configured to control operations of the components based on control of the control device 171. More specifically, each of the drive circuits is composed of, e.g., an amplifier circuit configured to perform feedback control for a motor, or a signal processing circuit configured to acquire a signal from a sensor.

The folder-gluer 1 is wiredly or wirelessly connected to a management device 181. In the first embodiment, the management device 181 is designed to generally manage processing of the corrugated paperboard sheet SS in the corrugated paperboard box making machine. The management device 181 is configured to generate control instruction information according to a processing management plan regarding a plurality of predetermined orders. For example, this control instruction information includes the conveyance speed of the corrugated paperboard sheet SS, the rotation speed (control target speed) of a main motor, the sizes of the entirety and each part of the corrugated paperboard sheet SS, a sheet number to be processed, and a corrugated paperboard sheet material. Before starting processing the corrugated paperboard sheet SS, the control device 171 is operable to acquire control instruction information necessary for control of the folder-gluer 1, from the management device 181. Here, the management device 181 is also configured to transmit control instruction information to various other apparatuses equipped in the corrugated paperboard box making machine, in addition to the folder-gluer 1. However, in FIG. 12, illustration of such other apparatuses (printer, etc.) than the folder-gluer 1 is omitted to avoid complication of the drawing. As a method of operation or control for other apparatuses, any suitable heretofore-known method may be employed.

(Operation of Folder-Gluer)

The operation of the folder-gluer 1 will be described. First of all, the management device 181 transmits control instruction information necessary for executing a given order, to the control device 171. According to the control instruction information acquired from the management device 181, the control device 171 operates to drive the servomotor of each moving mechanism (such as the inlet-side moving mechanism 24) to move each support member (such as the upper support frame 20A, thereby causing each support member to be disposed at a position conforming to the breadth of the corrugated paperboard sheet SS in the width direction WD set by the control instruction information. In the first embodiment, the control device 171 operates to cause the upper support frame 20A and the upper support frame 20B to be disposed, respectively, just above the crease line PK2 and the crease line PK4 (see FIG. 2) of the corrugated paperboard sheet SS being conveyed. In the first embodiment, the control device 171 also operates to cause a bending plate (illustration is omitted) of the lower support frame 22A to be disposed at a position where it contacts the crease line PK2 of the corrugated paperboard sheet SS from therebelow, and cause a bending plate (illustration is omitted) of the lower support frame 22B to be disposed at a position where it contacts the crease line PK4 of the corrugated paperboard sheet SS from therebelow. As shown in FIG. 5, the control device 171 operates to cause the lower belt 139 and the lower conveyor belt 48A to be disposed at respective positions located across the connection part CN1 in the width direction WD. Further, the control device 171 operates to cause the rearward lower conveyor belt 48B to be disposed at a position where it contacts the lower surface of the third panel P3.

According to the control instruction information, the control device 171 operates to drive each motor (such as the upper conveyance motor 42 and the lower conveyance motor 50) to endlessly circulate each belt (such as the panel-bending belt 58A, the lower conveyor belt 48A, etc.) at a given circulation speed. This allows each belt to be endlessly circulated at a desired circulation speed depending on the weight, etc., of the corrugated paperboard sheet SS of the order. The conveyance assist device 49 is driven interlockingly with rotation of the lower conveyance motor 50 to endlessly circulate the lower belt 139, e.g., at the same speed as that of the lower conveyor belt 48A. The control device 171 also operates to drive the servomotor 157 of the guide device 51 to endlessly circulate the upper belt 156 at the same speed as that of the lower belt 139.

When the sheet feeding apparatus of the corrugated paperboard box making machine is activated and feeding of the corrugated paperboard sheets SS is started, each of the corrugated paperboard sheets SS is processed by the printer on the upstream side with respect to the folder-gluer 1, and then fed to the inlet of the folder-gluer 1. The corrugated paperboard sheet SS is conveyed in the conveyance direction PD while being nipped between the pair of upper conveyor belts 40A, 40B and the pair of lower conveyor belts 48A, 48B.

The control device 171 operates to cause the glue application device 14 to discharge the glue in conformity to a timing when the gluing tab GS of the corrugated paperboard sheet SS passes through the glue application device 14. In the first embodiment, the control device 171 operates to cause the glue application device 14 to discharge the glue only for a predetermined discharge duration. For example, the control device 171 operates to determine a discharge start timing, from a time when the leading edge FE of the corrugated paperboard sheet SS being fed from the upstream station is detected by the sheet detector 91. Specifically, a distance DT between the gluing tab GS and the openings 99A of the glue application device 14 along the conveyance direction PD at the time when the leading edge FE is detected by the sheet detector 91 is expressed by the following formula:

Distance DT=(Distance between the openings 99A and the sheet detector 91 along the conveyance direction PD)+(Distance between the sheet detector 91 and the gluing tab GS along the conveyance direction PD)

A value of the distance between the openings 99A and the sheet detector 91 along the conveyance direction PD is preliminarily stored in, e.g., the storage device 172 (see FIG. 12) of the folder-gluer 1. In the corrugated paperboard sheet SS used in the first embodiment as illustrated in FIG. 2, a distance between the sheet detector 91 and the gluing tab GS (distance between the leading edge FE and the gluing tab GS) along the conveyance direction PD at the time when the leading edge FE is detected by the sheet detector 91 is equivalent to the length of the leading flap F1F along the conveyance direction PD. Therefore, the control device 171 can detect the distance between the sheet detector 91 (leading edge FE) and the gluing tab GS, from information about the order (the length of the leading flap F1F along the conveyance direction PD). Alternatively, the control device 171 may be configured to accept a value of the distance between the leading edge FE and the gluing tab GS, from the user. For example, since there is a possibility that the length L1 of the gluing tab GS is different from the length of the first panel P1, the control device 171 may be configured to accept a value of the distance between the leading edge FE and the gluing tab GS, with respect to each order. In the first embodiment, the control device 171 operates to count pulse signals acquired from the conveyance amount detector 44 to calculate an actual conveyance speed of the corrugated paperboard sheet SS. The control device 171 operates to calculate the distance DT from the above information and formula, and divide the calculated distance DT by the conveyance speed detected by the conveyance amount detector 44. This makes it possible to detect a period of time from the timing when the leading edge FE is detected by the sheet detector 91 through until the gluing tab GS reaches the openings 99A.

In the first embodiment, the control device 171 operates to cause the glue application to be started from a position located rearward of a leading edge of the gluing tab GS in the conveyance direction PD by a given distance. That is, the control device 171 operates to provide a margin where no glue is applied, between a leading edge of a glue application zone on the gluing tab GS, and the leading edge of the gluing tab GS. Similarly, the control device 171 operates to provide another margin where no glue is applied, between a trailing edge of the glue application zone on the gluing tab GS, and a trailing edge of the gluing tab GS. In the first embodiment, the control device 171 operates to divide the length of the margin of the gluing tab GS provided on the side of the leading edge FE, by the conveyance speed detected by the conveyance amount detector 44. Then, the control device 171 operates to add the period of time calculated from the margin to the period of time calculated from the distance DT to determine the period of time from the time when the leading edge FE is defected by the sheet detector 91 through until the glue discharge is started. This makes it possible to avoid starting the glue application from the leading edge of the gluing tab GS, thereby suppressing stray glue from the gluing tab GS and dropping of the stray glue.

In the first embodiment, the control device 171 operates to set a period of time obtained by dividing the length of the glue application zone along the conveyance direction PD (e.g., a length obtained by subtracting the leading and trailing margins from the length L1 of the gluing tab GS) by the conveyance speed detected using the conveyance amount detector 44, as a discharge duration during which glue discharge is continued from the discharge start timing. A method of setting the discharge duration of the glue is not limited to the above method. For example, the control device 171 needs not necessarily be configured to set the above margins. The control device 171 may be configured to cause the glue application to be started from the leading edge of the gluing tab GS. Further, the control device 171 may use the conveyance speed (target conveyance speed) set in the control instruction information, as the conveyance speed for setting the discharge duration. In this case, the folder-gluer 1 needs not necessarily comprise the conveyance amount detector 44. Alternatively, the folder-gluer 1 may comprise a sheet sensor for detecting the fact that the gluing tab GS of the corrugated paperboard sheet SS reaches the glue application device 14. In this case, the control device may be configured to determine the discharge start timing, according to a distance between the sheet sensor and the openings 99A of the nozzle 99 in the conveyance direction PD, and the conveyance speed.

As described above, the folder-gluer 1 according to the first embodiment comprises the conveyance assist device 49 and the guide device 51, as a device for conveying the first panel P1 during the glue application. The conveyance assist device 49 and the guide device 51 convey the first panel P1 in the conveyance direction PD while contacting the first panel P1, during a period during which the gluing tab GS passes through a space between the openings 99A and the second segment 96B of the glue application device 14, i.e., during a period during which the glue is applied onto the gluing tab GS. The first panel P2 is conveyed in the conveyance direction PD by the conveyance assist device 49 and the guide device 51, at the same speed as that of other panels (second panel P2, etc.).

The corrugated paperboard sheet SS in which the glue is applied on the gluing tab GS is conveyed to the first bending station 10. In the first bending station 10, the first panel P1 and the fourth panel P4 of the corrugated paperboard sheet SS are bent from a 0-degree position, i.e., flat state, to an about 90-degree position, respectively, by the bending bar 46A and the bending bar 46B. The corrugated paperboard sheet SS in which the first and fourth panels P1, P4 are bent to the about 90-degree position is moved to the second bending station 12, and conveyed toward the downstream end by the upper conveyor belts 40A, 40B, while the distance between the crease lines PK2, PK4 is regulated to a given guide distance by the guiding and regulating mechanisms 60A, 60B. In this process, the first panel P1 and the fourth panel P4 are bent from the about 90-degree position to a 180-degree position, respectively, by the panel-bending belt 58A and the panel-bending belt 58B. Subsequently, the corrugated paperboard sheet SS subjected to folding and gluing are discharged from the folder-gluer 1 in the form of a box structure, and accumulated by a counter-ejector. The box structure formed from the glued corrugated paperboard sheet SS can be formed into a cubic corrugated paperboard box by bending the leading flaps F1F to E4F along the score line WK1 and bending the trailing flaps F1R to E4R along the score line WK2.

Incidentally, in the above first embodiment, the folder-gluer 1 is one example of “gluer apparatus” set forth in the appended claims. The glue application device 14 is one example of “applicator device” set forth in the appended claims. The lower support frame 22A is one example of “support frame” set forth in the appended claims. A combination of the lower conveyor belts 48A, 48B and the lower conveyance motor 50 is one example of “first conveyance device” set forth in the appended claims. The lower conveyor belt 48A is one example of “driving belt” set forth in the appended claims. The lower conveyance motor 50 is one example of “drive source” set forth in the appended claims. The conveyance assist device 49 is one example of “second conveyance device” set forth in the appended claims. The main pulley 121 is one example of “driving rotary member” set forth in the appended claims. The main pulley 131 is one example of “first rotary member” set forth in the appended claims. The plate 135 is one example of “support member” set forth in the appended claims. Each of the pulleys 137 is one example of “second rotary member” set forth in the appended claims. The lower belt 139 is one example of “belt” set forth in the appended claims. The plate 153 is one example of “guide device support member” set forth in the appended claims. The pulleys 155 are one example of “belt rotary members” set forth in the appended claims. The upper belt 156 is one example of “guiding belt” set forth in the appended claims. The servomotor 157 is one example of “guide device drive source” set forth in the appended claims. The air cylinder 159 is one example of “moving device” or “fluid pressure cylinder” set forth in the appended claims. The plate 163 is one example of “upper support frame” set forth in the appended claims. The bracket 165 is one example of “guide device support member” set forth in the appended claims. The gluing tab GS is one example of “to-be-bonded part” set forth in the appended claims. Each of the first panel P1 and the fourth panel P4 is one example of “folding panel” set forth in the appended claims. Each of the second panel P2 and the third panel P3 is one example of “non-folding panel” set forth in the appended claims.

As above, the first embodiment can achieve the following effects.

(1) The folder-gluer 1 according to the first embodiment is a gluer apparatus for applying a glue to the gluing tab GS of the corrugated paperboard sheet SS. The corrugated paperboard sheet SS comprises: the first panel P1 which is a folding panel provided with the gluing tab GS, and the second panel P2 which is a non-folding panel connected to the first panel P1 through the connection part CN1. The folder-gluer 1 comprises the lower conveyor belt 48A for conveying the second panel P2 in the conveyance direction PD while contacting the second panel P2, and the lower conveyance motor 50. The folder-gluer 1 further comprises the conveyance assist device 49 configured to convey the first panel P1 in the conveyance direction PD while contacting the first panel P1, during contact between the glue application device 14 and the gluing tab GS.

Here, a contact-type glue gun such as the glue application device 14 in the first embodiment is configured to apply a glue while allowing the openings 99A of the nozzle 99 to contact the gluing tab GS, so that it can stably apply the glue as compared to a non-contact type glue gun, without occurrence of splashing of the glue. On the other hand, there is a possibility that the contact between the openings 99A and the gluing tab GS generates friction, resulting in slowdown or delay in a conveyance speed of the gluing tab GS as compared to other parts. For example, in a case where a discharge duration of the glue is preliminarily set as in the first embodiment, the occurrence of the delay causes unevenness or insufficiency of glue application. In particular, as the length of the connection part CN1 in the conveyance direction PD becomes shorter (in the first embodiment, as the length L1 of the glue tab GS becomes shorter, or as the depth of an intended corrugated paperboard box becomes shallower) (e.g., becomes 100 mm or less), the moment of inertia of area of the connection part CN1 becomes smaller, which is likely to increase the delay in the conveyance speed. Supposing a case where the conveyance assist device 49 is not provided, when the lower conveyor belt 48A conveys the second panel P2 while contacting the lower surface of the second panel P2, and the gluing tab GS contacts the contact-type glue gun, the first panel P1 is inclined along an approximately horizontal plane obliquely toward the upstream side with respect to the conveyance direction PD around the connection part CN1, due to a frictional force generated in the gluing tab GS. Further, considering that a fulcrum is located on the side of the second panel P2 being in contact with the lower conveyor belt 48A, as the width L2 of the first panel P1 in the width direction WD becomes longer (e.g., 700 mm or more), a larger moment is generated in the gluing tab GS, which is likely to cause an increase in the delay.

The first bending station 10 equipped with the glue application device 14 reserves as a folder for bending the first panel P1 provided with the gluing tab GS during the process of conveyance. Thus, it is difficult to configure the lower conveyor belts 48A, 48B provided over the entire area of the first bending station 10 in the conveyance direction PD to be contactable with the first panel P1 to be bent. As a result, when performing glue application to which no conveyance force is applied, while conveying the second panel P2 and the third panel P3 by the lower conveyor belts 48A, 48B, the first panel P1 is likely to be slowed down or delayed, resulting in occurrence of defective glue application.

As a method to improve this defective glue application, it is conceivable to employ, e.g., a method which comprises appropriately changing the discharge duration of the glue, in response to the delay occurring in the first panel P1. However, this method requires setting the discharge start timing and/or the discharge duration, depending on the amount of delay of a corrugated paperboard sheet SS to be produced, each time a corrugated paperboard sheet SS having a relatively shallow depth or a corrugated paperboard sheet SS having a relatively long width L2 is produced. This results in increased workload of a user. In addition, even in the same production order, the amount of delay of the first panel P1 occurring per corrugated paperboard sheet SS is not always constant. Therefore, even if the same discharge duration is set in the same production order, there is a possibility that defective glue application occurs.

As a method to improve the delay, it is conceivable to employ, e.g., a method which comprises reducing a production rate of the corrugated paperboard box making machine as the moment of inertia of area or the influence of moment becomes smaller. However, this method requires lowering a conveyance speed in other apparatuses in addition to the folder-gluer 1, leading to a problem that production efficiency is significantly down.

Therefore, the folder-gluer 1 of the first embodiment is provided with the conveyance assist device 49 for conveying the first panel P1, as shown in FIG. 5, when glue application is performed by the glue application device 14. According to this configuration, the first panel P1 having a longer length than that of the connection part CN1 in the connection part CN1 is supported by the conveyance assist device 49, so that it is possible to substantially increase the moment of inertia of area, thereby suppressing the inclination of the first panel P1. Further, a conveyance force is directly applied to the first panel P1 provided with the gluing tab GS, so that it is possible to suppress the inclination of the first panel P1 and curve of the connection part CN1, thereby reducing the delay which would otherwise occur in the gluing tab GS. Further, a fulcrum is set in the first panel P1, so that it is possible to bring the fulcrum closer to the point of action of a moment occurring in the first panel P1, in the width direction, thereby making the moment smaller so as to suppress the inclination of the first panel P1, and evenly applying the glue up to the trailing end of the gluing tab GS. Further, the need for adjustment of the discharge duration by a user as in the aforementioned another method is eliminated, so that it is possible to reduce workload of the user. Further, the need for reducing the production rate of the corrugated paperboard box making machine is eliminated, so that it is possible to improve production efficiency.

(2) The lower conveyor belt 48A is configured to convey the second panel P2 at a given first speed. The conveyance assist device 49 is disposed at a position opposed to the glue application device 14 in the width direction WD. Specifically, in the first embodiment, the glue applicator device 14 is disposed at a position above the lower belt 139 while interposing the corrugated paperboard sheet SS therebetween in the up-down direction, wherein the position is offset from the lower belt 139 in a direction parallel to the width direction WD. Further, the conveyance assist device 49 is configured to convey the first panel P1 in the conveyance direction PD at a speed identical to the first speed. According to this configuration, the first panel P1 can be conveyed at a speed identical to the first speed by the conveyance assist device 49 disposed at a position opposed to the glue application device 14 in the width direction WD. Thus, it is possible to convey the corrugated paperboard sheet SS while allowing the leading edge FE of the corrugated paperboard sheet SS to extend along a direction parallel to the width direction WD.

(3) The conveyance assist device 49 comprises: the main pulley 131 configured to be rotated according to driving of the lower conveyance motor 50; the plate 135 mounted to the lower support frame 22A of the folder-gluer 1; the pulleys 137 each rotatably mounted to the plate 135 and the lower belt 139 wound around the main pulley 131 and the pulleys 137, and configured to be endlessly circulated based on driving of the lower conveyance motor 50, while contacting the lower surface of the first panel P1, to convey the first panel P1 in the conveyance direction PD. In this configuration, the lower belt 139 is endlessly circulated according driving of the lower conveyance motor 50 to convey the first panel P1, so that it is possible to reduce the delay of the gluing tab GS.

Figure 15:
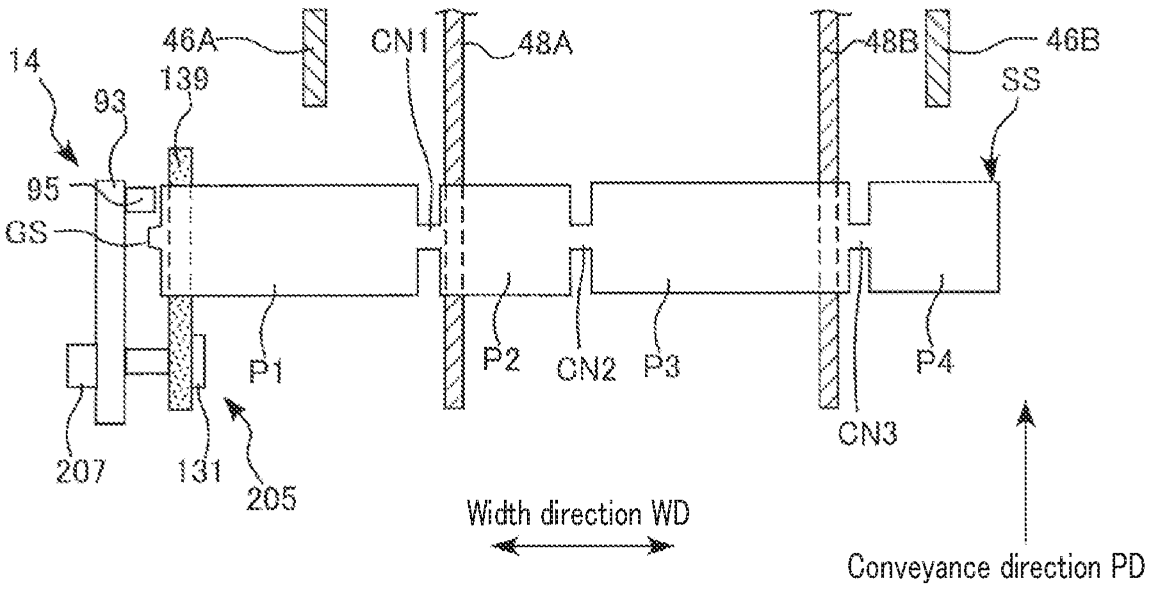
FIG. 15 is a schematic top plan view of the corrugated paperboard sheet, a glue application device, a conveyance assist device, and a first bending station in a third embodiment of the present invention.

(4) The first bending station 10 comprises: the main pulley 121 configured to be rotated based on driving of the lower conveyance motor 50; and the lower conveyor belt 48A wound around the main pulley 121, and configured to be endlessly circulated based on driving of the lower conveyance motor 50, while contacting the lower surface of the second panel P2, to convey the second panel P2 in the conveyance direction PD. The main pulley 131 is coupled to the main pulley 121, such that it is rotated integrally together with the main pulley 121. According to this configuration, it becomes possible to share a common drive source by the conveyance device for conveying the second panel P2 and the conveyance assist device 49. Thus, the number of drive sources can be reduced to achiever reduction in production costs. Further, sharing of a common drive source facilitates synchronization of the lower conveyor belt 48A and the lower belt 139, so that it is possible to simplify the processing details of control for endlessly circulating them at the same speed. It is possible to employ a configuration in which the lower conveyor belt 48A (the lower belt 139) is disposed adjacent to the gluing tab GS, as in the after-mentioned third embodiment illustrated in FIG. 15. From a viewpoint of bringing the fulcrum and the point of action of a moment closer to each other to transmit a conveyance force more directly to the gluing tab GS, the configuration illustrated in FIG. 15 is effective. On the other hand, the glue application device 14 according to the first embodiment is configured such that the positional relationship between the head 95 and the sheet guide 96 in the up-down direction can be reversed so as to cope with both the inner gluing and outer gluing operations, as mentioned above. If the conveyance assist device 49 (the after-mentioned conveyance assist device 205) is disposed on the side closer to the gluing tab GS, as illustrated in FIG. 15, and a different drive source from the lower conveyance motor 50 is also disposed around the position, a structure around the glue application device 14 (structure for mounting the glue application device 14 to the support plate 93) is likely to be complicated. As a result, it becomes difficult to ensure a working space for reversing the positional relationship between the head 95 and the sheet guide 96. Thus, the conveyance assist device 49 is disposed on the side closer to the lower conveyor belt 48A as in the first embodiment, so that it is possible to satisfy both reduction in production costs by sharing of a common drive source, and reduction in workload to reverse the positional relationship between the head 95 and the sheet guide 96.

(5) The conveyance assist device 49 comprises: the collar 133 disposed between the main pulley 131 and the main pulley 121 in an axial direction of the rotation axis 125 of the main pulley 131; and the fastening members 141, 143 fixing the main pulley 131 to the main pulley 121. The connection part CN1 is conveyed in the conveyance direction PD just above the collar 133. According to this configuration, the distance between the lower belt 139 and the lower conveyor belt 48A in the width direction WD can be adjusted by the collar 133. For example, the thickness of the collar 133 in the width direction WD is set to be equal or greater than the largest length of the connection part CN1 (the leading slot S1 or the trailing slot S4) in the width direction, among various corrugated paperboard sheets SS handleable by the corrugated paperboard box making machine. This results in making it possible to dispose the lower belt 139 at a position where it contacts the first panel P1, and adequately dispose the lower conveyor belt 48A at a position where it contacts the second panel P2.

(6) The folder-gluer 1 further comprises the guide device 51. The guide device 51 is disposed at a position opposed to the conveyance assist device 49 in the up-down direction, and configured to guide the first panel P1 in the conveyance direction PD while nipping the first panel P1 between the guide device 51 and the conveyance assist device 49. According to this configuration, it becomes possible to stably convey the first panel P1 by the conveyance assist device 49, while nipping the first panel P1 between the conveyance assist device 49 and the guide device 51. This results in making it possible to more reliably resolve the delay which would otherwise occur in the gluing tab GS.

(7) The guide device 51 comprises: the plate 153; the plurality of pulleys 155 each rotatably mounted to the plate 153; the upper belt 156 wound around the plurality of pulleys 155; and the air cylinder 159 configured to allow the upper belt 156 to be selectively disposed at one of the contact position 168 where the upper belt 156 is in contact with the first panel P1 and the spaced-apart position 167 where the upper belt 156 is spaced apart from the first panel P1. According to this configuration, it becomes possible to switch, by the air cylinder 159, between one mode in which the guide device 51 is in contact with the first panel P1 to nip the first panel P1 in cooperation with the conveyance assist device 49, and another mode in which the guide device 51 is spaced apart from the first panel P1 without nipping the first panel P1. For example, in a situation where no delay of the gluing tab GS occurs depending on the length L1 and/or the width L2, the first panel P1 may be conveyed while the guide device 51 is disposed at the spaced-apart position 167.

(8) The guide device 51 comprises the servomotor 157 configured to endlessly circulate the upper belt 156. The servomotor 157 is configured to, based on control of the control device, endlessly circulate the upper belt 156 at a speed identical to a speed at which the conveyance assist device 49 conveys the first panel P1 in the conveyance direction PD. More specifically, the servomotor 157 is configured to rotate the main pulley 151 so as to endlessly circulate the upper belt 156 at the same speed as that of the lower belt 139. According to this configuration, it becomes possible to apply conveyance forces, respectively, to the upper and lower surfaces of the first panel P1 at the same speed, thereby more stably conveying the first panel P1.

(9) The air cylinder 159 is composed of a fluid pressure cylinder configured to urge the plate 153 in an upward direction away from the conveyance assist device 49. The air cylinder 159 is configured to, in a state in which a first fluid pressure is suppled thereto, move the plate 153 to the spaced-apart position 167. The air cylinder 159 is also configured to, in a state in which a second fluid pressure less than the first fluid pressure is suppled thereto, move the plate 153 to the contact position 168, and urge the plate 153 in the upward direction by an urging force for canceling out a force which is applied from the guide device 51 (the plate 153, etc.) to the first panel P1 due to the weight of the guide device 51. According to this configuration, it becomes possible to cancel out a gravitational force acting on the guide device 51, by the air cylinder 159, thereby allowing the guide device 51 to be disposed at the contact position 168 as if it were floating. Thus, when the upper belt 156 comes into contact with the first panel P1 conveyed toward the nipping zone 147, the upper belt 156 is lifted, so that the upper belt 156 can adequately contact the upper surface of the first panel P1.

(10) The folder-gluer 1 comprises the plate 163 supporting the guide device 51 at a position just above the conveyance assist device 49. The air cylinder 159 of the guide device 51 is configured to move the plate 153 and the bracket 165 between the spaced-apart position 167 where the upper belt 156 is spaced apart from the first panel P1 and the contact position 168 which is lower than the spaced-apart position 167 and where the upper belt 156 is in contact with the first panel P1. The guide device 51 further comprises the stopper 169 mounted to the block 175 of the upper support frame 20A. The stopper 169 is configured to be brought into contact with the protective member 178 of the bracket 165, thereby restricting the downward movement of the bracket 165. According to this configuration, it becomes possible to restrict the downward movement of the bracket 165 by the stopper 169, thereby stopping the downward movement of the pulleys 155 at a given position.

In the first embodiment, the guide device 51 may be configured to bring the upper belt 156 into contact with the lower belt 139 without any gap therebetween. For example, the stopper 169 is adjusted to allow the upper belt 156 to be stopped at a position where it comes into contact with the lower belt 139. Then, just after the first panel P1 is conveyed from the upstream side and brought into contact with the upper belt 156, the upper belt 156 may be moved upwardly in conformity to the thickness of the first panel P1, while being endlessly circulated. According to this configuration, even if a gap is formed between the upper belt 156 and the lower belt 139 due to wear thereof, the first panel P1 can be conveyed without position adjustment of the upper belt 156 by a user, as long as the gap is small enough to convey the first panel P1.

Second Embodiment

Figure 13:
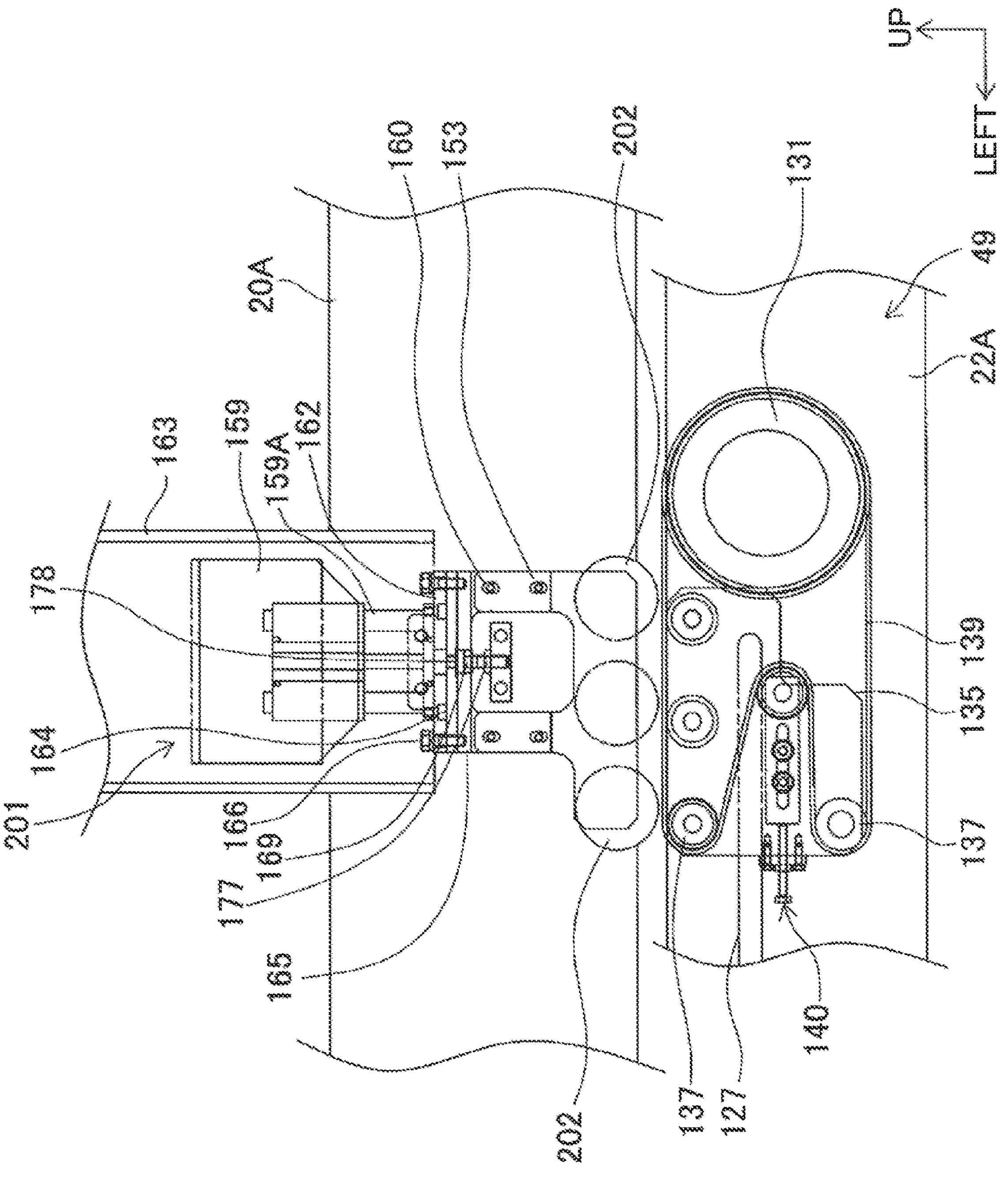
FIG. 13 is a front view of a guide device and a conveyance assist device in a second embodiment of the present invention.
Figure 14:
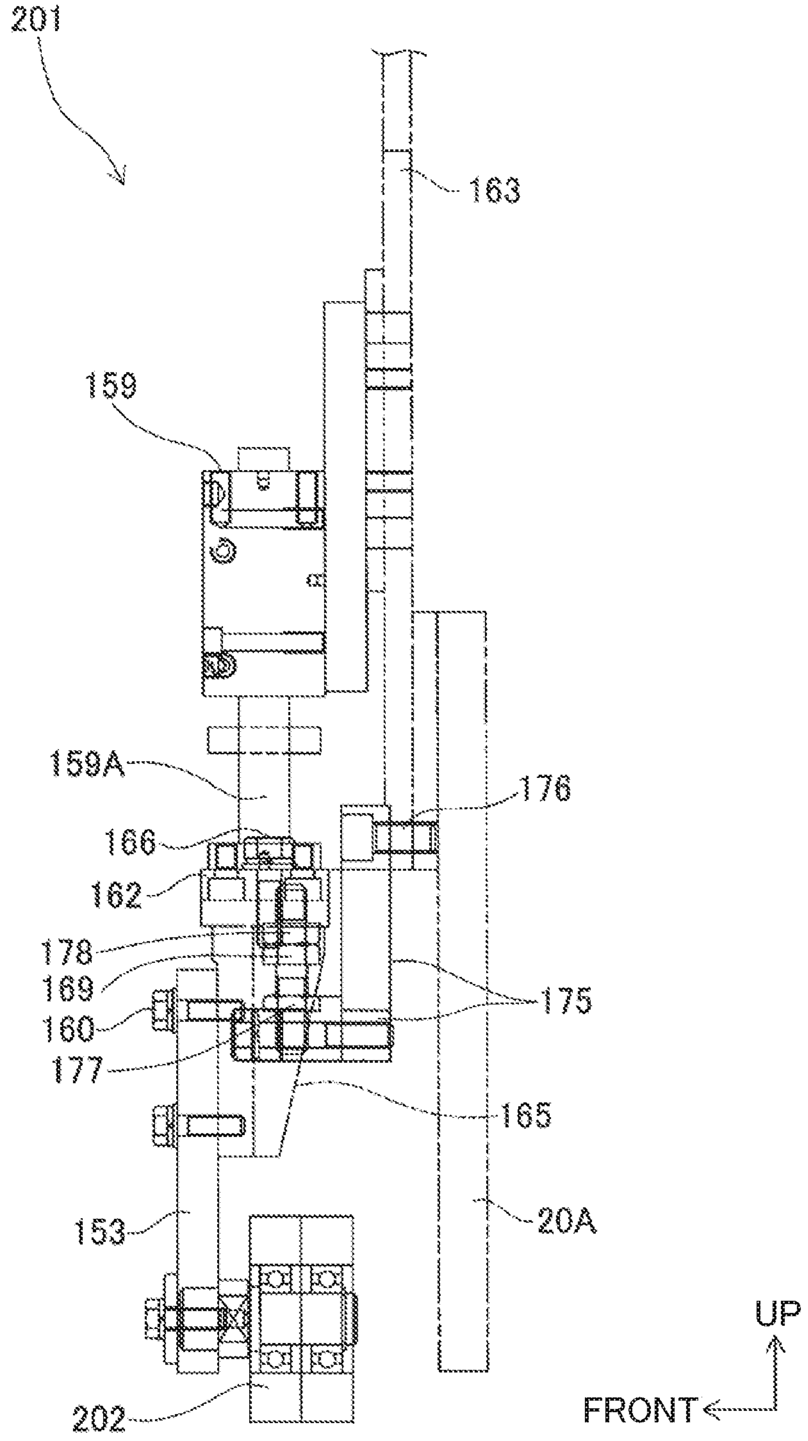
FIG. 14 is a side view of the guide device in FIG. 13, as viewed in the right-left direction.

Next, a folder-gluer according to a second embodiment of the present invention will be described. FIGS. 13 and 14 show a guide device 201 in the second embodiment.

In the following description, an element or component similar to that in the first embodiment is assigned with the same reference sign as that in the first embodiment, and its description will be appropriately omitted. As illustrated in FIGS. 13 and 14, the guide device 201 in the second embodiment comprises a plurality of (in the second embodiment, three) no-crush rollers (no-crush wheels) 202 to be brought into contact with the upper surface of the first panel P1. The no-crush rollers 202 are provided rearward of a plate 153, and rotatably provided to the plate 153. In the second embodiment, each of the no-crush rollers 202 is formed with grooves axially penetrating therethrough, so that a pressing force occurring when the no-crush roller 202 is pressed against the first panel P1 can be adjusted by the grooves, thereby making it less likely that a roller mark is left on the firs panel P1. Further, differently from the guide device 51 in the first embodiment, the guide device 201 is devoid of the upper belt 156 and a mechanism (the main pulleys 151, 152 and the servomotor 157) for endlessly circulating the upper belt 156. That is, the guide device set forth in the appended claims is not limited to a device configured to drive a drive source to actively convey the first panel P1, but may be a device configured to be rotated or endlessly circulated in a following manner.

The guide device 201 is configured such that when the second air pressure is supplied to an air cylinder 159 and the plate 153 is disposed at the contact position 168, a small gap is formed between each of the no-crush rollers 202 and a lower belt 139 of a conveyance assist device 49, as with the first embodiment. The guide device 201 is also configured such that when the first panel P1 is conveyed to reach the no-crush rollers 202, the no-crush rollers 202 are lifted by the first panel P1, and are rotated by the first panel P1 in a following manner, while contacting the upper surface of the first panel P1. Thus, the first panel P1 is conveyed while being nipped between the no-crush rollers 202 and the lower belt 139.

Incidentally, in the second embodiment, each of the no-crush rollers 202 is one example of “guiding rotary member” set forth in the appended claims. It should be noted that the guiding rotary member set forth in the appended claims is not limited to a no-crush roller, but may be a resinous rubber roller.

The second embodiment can achieve the same effects as those in the first embodiment.

Further, the guide device 201 in the second embodiment comprises: the no-crush rollers 202 each rotatably mounted to the plate 153; and the air cylinder 159 configured to move the plate 153 between a contact position 168 where the no-crush rollers 202 are in contact with the first panel P1 and a spaced-apart position 167 where the no-crush rollers 202 are spaced apart from the first panel P1. According to this configuration, it becomes possible to rotate the no-crush rollers 202 in a following manner to convey the first panel P1 while nipping the first panel P1 between the no-crush rollers 202 and the conveyance assist device 49. In addition, it becomes possible to eliminate the need to provide, for the no-crush rollers 202, a drive source such as the servomotor 157, thereby facilitating reduction in production costs.

In the second embodiment, the guide device 201 may be configured to bring the no-crush rollers 202 into contact with the lower belt 139 without any gap therebetween. In this case, a stopper 169 is adjusted to allow the no-crush rollers 202 to be stopped at a position where they come into contact with the lower belt 139. Thus, the no-crush rollers 202 are preliminarily brought into contact with the lower belt 139 and rotated by the lower belt 139, until the first panel P1 is convened from the upstream side to reach the no-crush rollers 202. Then, after the first panel P1 convened from the upstream side comes into contact with the no-crush rollers 202, the first panel P1 can move the no-crush rollers 202 upwardly in conformity to the thickness thereof, while allowing the no-crush rollers 202 to keep rotating. In order words, it is possible to lift the no-crush rollers 202 to a position according to the thickness of the first panel P1, and apply a torque arising from the preliminary rotation, to the first panel P1. Even in the guide device 201 devoid of a drive source such as the servomotor 157 as in the second embodiment, the no-crush rollers 202 can be preliminarily rotated before the first panel P1 is conveyed from the upstream side to reach the no-crush rollers 202, by bringing the no-crush rollers 202 into contact with the lower belt 139. In a case where the no-crush rollers 202 are not preliminarily rotated before the first panel P1 is conveyed to reach the no-crush rollers 202, since it is necessary to rotate the no-crush rollers 202 in a non-rotating state by the first panel P1, a loss of kinetic energy occurs, which is likely to cause the delay of the first panel P1. Such a loss of kinetic energy can be reduced by preliminarily bringing the no-crush rollers 202 into contact with the lower belt 139.

Third Embodiment

Next, a folder-gluer according to a third embodiment of the present invention will be described. In the first embodiment, the guide member 51 is configured to sharingly use, as a drive source, the lower conveyance motor 50 for driving the lower conveyor belt 48A. Differently, as shown in FIG. 15, a conveyance assist device 205 in the third embodiment comprises a servomotor 207 as a drive source for rotating a main pulley 131 (endlessly circulating a lower belt 139). The servomotor 207 is mounted to, e.g., a support plate 93 of a glue application device 14. Further, the main pulley 131 and pulleys 137 (see FIG. 7) are rotatably mounted to, e.g., the support plate 93. The main pulley 131 of the conveyance assist device 205 is coupled to an output shaft of the servomotor 207. The conveyance assist device 205 is configured to endlessly circulate the lower belt 139 when the servomotor 207 is driven based on control of a control device 171 (see FIG. 12).

The conveyance assist device 205 is configured to be moved in the width direction together with the glue application device 14, e.g., based on driving of a glue application device-moving mechanism 94. The lower belt 139 is disposed at a certain distance from a head 95 in the width direction WD. When the glue application device 14 is disposed at the position of the gluing tab GS, the lower belt 139 is disposed at a position where it contacts the lower surface of the first panel P1 in an area adjacent to the gluing tab GS in the width direction WD. Although illustration is omitted, a guide device 51 may be mounted to the support plate 93 and disposed just above the conveyance assist device 205. Here, the above-mentioned area adjacent to the gluing tab GS in the width direction WD means, e.g., an area of the first panel P1 located on the side closer to the gluing tab GS and adjacent to the crease line PK1. Alternatively, the area adjacent to the gluing tab GS in the width direction WD may be an area of the first panel P1 located on the side closer to the gluing tab GS with respect to the middle of the first panel P1 in the width direction WD.

Incidentally, in the third embodiment, the conveyance assist device 205 is one example of "second conveyance device" set forth in the appended claims. The servomotor 207 is one example of "drive source" set forth in the appended claims. The support plate 93 is one example of "applicator device frame" set forth in the appended claims.

The third embodiment can achieve the same effects as those in the first embodiment.

Further, the conveyance assist device 205 in the third embodiment comprises the servomotor 207. The servomotor 207 is mounted to the support plate 93 to which the head 95 is mounted. The conveyance assist device 205 is configured to contact the first panel P1 in an area adjacent to the gluing tab GS in the width direction WD to convey the first panel P1. According to this configuration, the lower belt 139 can be disposed at a position closer to the gluing tab GS. The lower belt 139 can be disposed on the side closer to the gluing tab GS, so that it becomes possible to reduce a moment acting on the gluing tab GS toward the trailing side of the conveyance direction PD, thereby more reliably reducing the inclination of the first panel P1 and the delay of the gluing tab GS.

Fourth Embodiment

Figure 16:
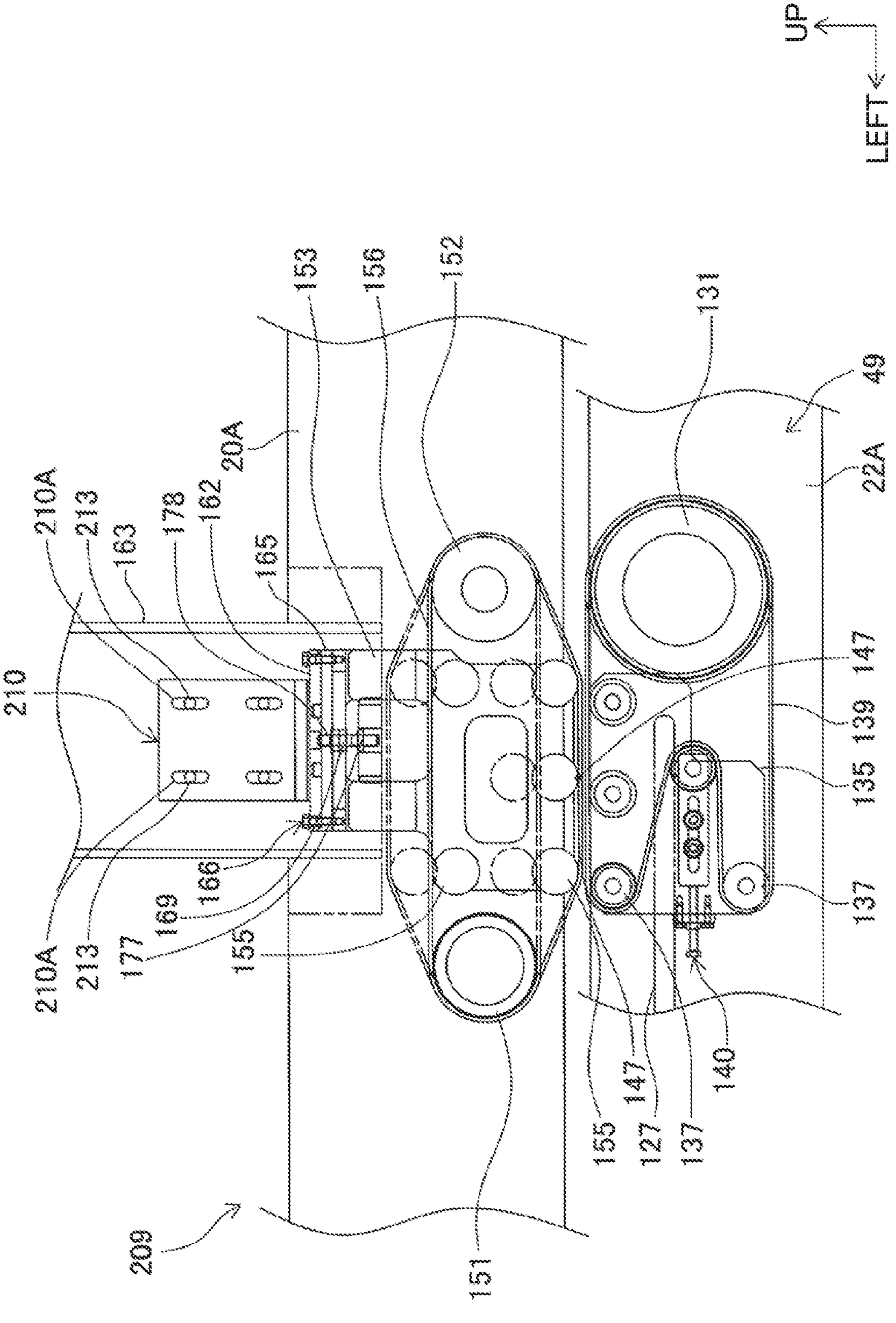
FIG. 16 is a front view of a guide device and a conveyance assist device in a fourth embodiment of the present invention.

Next, a folder-gluer according to a fourth embodiment of the present invention will be described. FIG. 16 shows a guide device 209 in the fourth embodiment. The guide device 209 in the fourth embodiment has a configuration devoid of the servomotor 157 and the air cylinder 159 capable of switching between one mode in which the guide device 51 nips the first panel P1 in cooperation with the conveyance assist device 49, and another mode in which the guide device 51 is spaced apart from the first panel P1 without nipping the first panel P1. A flat-shaped upper support frame 210, e.g., parallel to the up-down direction and the right-left direction, is mounted to a plate 163. The upper support plate 210 is formed with a plurality of (in the fourth embodiment, four) through-holes 210A. Each of the through-holes 210A is an elongate hole which is long in the up-down direction. A plurality of adjustment thread-engagement members 213 are associated, respectively, with the through-holes 210 A. Each of the adjustment thread-engagement members 213 is composed of, e.g., a bolt which is inserted into a corresponding one of the through-hole 210A and threadingly engaged with the plate 163. The upper support plate 210 is changed in terms of a position where it is fixed to the plate 163 in the up-down direction, depending on a position where each of the adjustment thread-engagement members 213 is threadingly engaged with and fixed to the plate 163 while being inserted into a corresponding one of the through-hole 210A. A coupling plate 162 is fixed to a lower end of the upper support plate 210. Thus, a bracket 165 and a plate 153 are fixed to the plate 163 through the upper support plate 210.

The following description will be made about a method for use in the guide device 209 in the fourth embodiment to adjust the position of an upper belt 156 in the up-down direction. When adjusting the gap between the upper belt 156 and a lower belt 139 to a value appropriate to the thickness of a corrugated paperboard sheet SS to be produced, as one example, a user first loosens all the adjustment thread-engagement members 213. Thus, the upper support plate 210, and the bracket 165, the upper belt 156, etc., mounted to the upper support plate 210, become movable in the up-down direction. Then, the user adjusts the position of the upper support plate 210 (positions of all the members including the bracket 165) in the up-down direction to allow the upper belt 156 to be set to an adequate contact position. In a state in which the upper support plate 210 is disposed at a desired position, the user adjusts the height (protruding amount) of a stopper 169. For example, the user adjusts the thread-engagement position of the stopper 169 with respect to a thread-engagement counterpart member 177, such that a protective member 178 in the state in which the upper support plate 210 is disposed at the desired position can contact the stopper 169. The user threadingly engages the adjustment thread-engagement members 213 with the plate 163 to fix the upper support plate 210 to the plate 163. In this way, the user can change the height position of the upper belt 156 by adjusting an insertion and fixing (fastening) position of each of the adjustment thread-engagement members 213 with respect to the upper support plate 210. A gap between the upper belt 156 and the lower belt 139 can be adjusted to a value more appropriate to the thickness of a corrugated paperboard sheet SS to be produced, by adjusting the height position of the upper belt 156 in a state in which the upper belt 156 is disposed at the contact position 168.

Further, the upper belt 156 can contact the lower belt 139, i.e., it is possible to eliminate the gap therebetween, by adjusting the insertion and fixing (fastening) position of each of the adjustment thread-engagement members 213 with respect to the upper support plate 210. In this case, even in the guide device 209 devoid of a drive source such as the servomotor 157, the upper belt 156 being in contact with the lower belt 139 can be preliminarily endlessly circulated before the first panel P1 is conveyed from the upstream side to reach the upper belt 156. As a result of allowing the upper belt 156 to be preliminarily endlessly circulated while contacting the lower belt 139, it becomes possible to reduce a loss of kinetic energy caused by contact between the upper belt 156 and the first panel P1.

The fourth embodiment can achieve the same effects as those in the first embodiment.

(1) Each of the adjustment thread-engagement members 213 in the fourth embodiment is inserted in the upper support plate 210 fixed to the coupling plate 162 and threadingly engaged with the plate 163. The upper support plate 210 and the upper belt 156 are changed in terms of an up-down directional position with respect to an upper support frame 20A (plate 163), depending on the insertion and fixing (fastening) position of each of the adjustment thread-engagement members 213 with respect to the upper support plate 210. As a result, the height position of the upper belt 156 relative to the first panel P1 is adjusted. According to this configuration, the position of the upper belt 156 can be adequately adjusted by adjusting the insertion and fixing (fastening) position of each of the adjustment thread-engagement members 213 with respect to the upper support plate 210, depending on the thickness of the corrugated paperboard sheet SS, without the need to provide a moving device such as the air cylinder 159.

(2) The stopper 169 in the fourth embodiment restricts a downward movement of the upper support plate 210 when it comes into contact with the protective member 178. Thus, even if the upper support plate 210 is urged to move downwardly due to loosening of the adjustment thread-engagement members 213, or the like, such a downward movement is restricted by the stopper 169. Further, a user can finely adjust the position of the upper support plate 210 in the up-down direction, i.e., the contact position 168, by adjusting the thread-engagement position of the stopper 169 with respect to the thread-engagement counterpart member 177. Thus, it is possible to achieve more adequate contact of the upper belt 156 with the first panel P1, through the adjustment of the stopper 169.

It is to be understood that the present invention is not limited to the above embodiments, but various changes and modifications may be made therein without departing from the spirit and scope thereof as set forth in appended claims.

For example, in the second embodiment illustrated in FIG. 13, a configuration devoid of the air cylinder 159 may be employed, as with the fourth embodiment illustrated in FIG. 16. In this case, the height position of the no-crush rollers 202 may be appropriately adjusted by the adjustment thread-engagement members 213 illustrated in FIG. 16.

Further, the folder-gluer in each embodiment may have a configuration devoid of the guide device (51, 201, 209).

In the above embodiments, the guide device (51, 201, 209) is disposed just about the first panel P1, and the conveyance assist device (49, 205) is disposed just below the first panel P1. However, this arrangement may be reversed. For example, the folder-gluer 1 may be configured such that the guide device 51 is disposed just below the first panel to allow the upper belt 156 to contact the lower surface of the first panel P1, and the conveyance assist device 49 is disposed just above the first panel P1 to allow the lower belt 139 to contact the upper surface of the first panel P1.

Further, the corrugated paperboard sheet SS is not limited to the configuration having four panels, but may be composed of any other number of panels, such as five panels and six panels.

In the above embodiments, the folder-gluer having a glue application function (gluer function) and a corrugated paperboard sheet folding (bending) function (folder function) is employed as the gluer apparatus set forth in the appended claims. However, the present invention is not limited thereto. The gluer apparatus may have a configuration devoid of the bending bars 46A, 46B, i.e., a configuration devoid of the folding (bending) function.

The positions of the belts (conveyance devices) illustrated in FIG. 5 are shown as one example. For example, the lower belt 139 may be disposed at the middle of the first panel P1 in the width direction WD. Further, the lower conveyor belt 48A may be provided at a position for conveying the third panel P3. Further, the lower conveyor belt 48B may be provided at a position for conveying the fourth panel P4. In this case, the gluer apparatus may be configured to perform only glue application, and a folding (bending) operation may be performed by a downstream apparatus. Further, in the case where the fourth panel P4 is subjected to glue application, as in the to-be-bonded part GS1 illustrated in FIG. 2, the conveyance assist device 49 and the guide device 51 may be disposed at a position where they contact the fourth panel P4.

Each of the first and second rotary members and the belt rotary members as set forth in the appended claims is not limited to an annular-shaped member such as a pulley, but may be a circular disk-shaped member or a circular cylindrical-shaped member. Further, each of the first and second rotary members and the belt rotary members may be a member made from resin such as rubber.

Further, each of the support member, the guide device support member and the upper support frame as set forth in the appended claims is not limited to a plate-shaped member such as the plate 135 or 153, but may be a rectangular parallelepiped-shaped or curved member.

The configuration of the conveyance assist device 49 in the first embodiment is shown as one example. For example, the conveyance assist device 49 may have a configuration devoid of the collar 133. For example, the maim pulley 131 may be configured to be coupled to the main pulley 121 with a gap corresponding to the thickness of the collar 133 therebetween.

The guide member 51 may have a configuration devoid of the coupling plate 162 and the bolts 166, wherein the bracket 165 may be fixed to the output rod 159A by welding or other fixing means.

Further, each of the first conveyance device and the second conveyance device set forth in the appended claims is not limited to a conveyance device using a belt, but may be a device configured to convey a corrugated paperboard sheet SS by allowing no-crush rollers or rubber rollers as drive rollers to contact corrugated paperboard sheet SS.

What is claimed is:

1. A gluer apparatus for applying an adhesive to a to-be-bonded part of a corrugated paperboard sheet, wherein the corrugated paperboard sheet comprises: a non-folding panel; and a folding panel to be folded with respect to the non-folding panel after the adhesive is applied to the to-be-bonded part, wherein the to-be-bonded part is provided in the folding panel, and the folding panel is connected to the non-folding panel through a connection part, the gluer apparatus comprising:

- a first conveyance device configured to convey the non-folding panel in a conveyance direction while contacting the non-folding panel;
- an applicator device configured to apply the adhesive to the to-be-bonded part while contacting the to-be-bonded part; and
- a second conveyance device configured to convey the folding panel in the conveyance direction while contacting the folding panel, during contact between the applicator device and the to-be-bonded part, wherein the second conveyance device comprises:

a first rotary member configured to be rotated according to driving of a drive source;

a support member mounted to a support frame of the gluer apparatus;

a second rotary member rotatably mounted to the support member; and a belt wound around the first rotary member and the second rotary member, and configured to be circulated based on driving of the drive source, while contacting a lower surface of the folding panel, to convey the folding panel in the conveyance direction.

2. The gluer apparatus as recited in claim 1, wherein the second conveyance device comprises the drive source, and the drive source is mounted to an applicator device frame to which the applicator device is mounted, and wherein the second conveyance device is configured to convey the folding panel while contacting the folding panel in an area adjacent to the to-be-bonded part in a width direction which is parallel to a planar surface of the non-folding panel and orthogonal to the conveyance direction.

3. The gluer apparatus as recited in claim 1, wherein the first conveyance device is configured to convey the non-folding panel in the conveyance direction at a first speed, while contacting a lower surface of the non-folding panel, and the second conveyance device is disposed at a position opposed to the applicator device in a width direction which is parallel to a planar surface of the non-folding panel and orthogonal to the conveyance direction, and configured to convey the folding panel in the conveyance direction at a speed identical to the first speed.

4. The gluer apparatus as recited in claim 1, wherein the first conveyance device comprises:

the drive source;

a driving rotary member configured to be rotated based on driving of the drive source;

a driving belt wound around the driving rotary member, and configured to be circulated based on driving of the drive source, while contacting a lower surface of the non-folding panel, to convey the non-folding panel in the conveyance direction;

wherein the first rotary member is coupled to the driving rotary member, so as to be rotated integrally together with the driving rotary member.

5. The gluer apparatus as recited in claim 4, wherein the second conveyance device comprises:

a collar disposed between the first rotary member and the driving rotary member in an axial direction of a rotation axis of the first rotary member; and a fastening member fixing the first rotary member to the driving rotary member;

wherein the connection part is conveyed in the conveyance direction above the collar.

6. The gluer apparatus as recited in claim 1, further comprising a guide device disposed at a position opposed to the second conveyance device in an up-down direction, and configured to guide the folding panel in the conveyance direction while nipping the folding panel between the guide device and the second conveyance device.

7. The gluer apparatus as recited in claim 6, wherein the guide device comprises:

a guide device support member;

a plurality of belt rotary members each rotatably mounted to the guide device support member;

a guiding belt wound around the plurality of belt rotary members; and a moving device configured to allow the guiding belt to be selectively disposed at one of a contact position where the guiding belt is in contact with the folding panel and a spaced-apart position where the guiding belt is spaced apart from the folding panel.

8. The gluer apparatus as recited in claim 7, wherein the guide device comprises a guide device drive source configured to circulate the guiding belt at a speed identical to a speed at which the second conveyance device conveys the folding panel in the conveyance direction.

9. The gluer apparatus as recited in claim 7, wherein the guide device is disposed above the second conveyance device, and the moving device comprises a fluid pressure cylinder configured to urge the guide device support member in an upward direction away from the second conveyance device, and wherein the fluid pressure cylinder is configured to:

in a state in which a first fluid pressure is suppled thereto, move the guide device support member to the spaced-apart position; and in a state in which a second fluid pressure less than the first fluid pressure is suppled thereto, move the guide device support member to the contact position, and urge the guide device support member in the upward direction by an urging force for canceling out a force which is applied from the guide device to the folding panel due to a weight of the guide device.

10. The gluer apparatus as recited in claim 6, comprising an upper support frame supporting the guide device at a position above the second conveyance device, wherein the guide device comprises:

a guide device support member;

a plurality of belt rotary members each rotatably mounted to the guide device support member;

a guiding belt wound around the plurality of belt rotary members;

a moving device configured to move the guide device support member between a spaced-apart position where the guiding belt is spaced apart from the folding panel and a contact position which is lower than the spaced-apart position and where the guiding belt is in contact with the folding panel; and a stopper mounted to the upper support frame and configured to restrict a downward movement of the guide device support member.

11. The gluer apparatus as recited in claim 6, wherein the guide device comprises:

a guide device support member;

a guiding rotary member rotatably mounted to the guide device support member; and a moving device configured to move the guide device support member between a contact position where the guiding rotary member is in contact with the folding panel and a spaced-apart position where the guiding rotary member is spaced apart from the folding panel.

12. The gluer apparatus as recited in claim 6, comprising an upper support frame supporting the guide device at a position just above the second conveyance device, wherein the guide device comprises:

a guide device support member;

a guiding rotary member rotatably mounted to the guide device support member;

a moving device configured to move the guide device support member between a spaced-apart position where the guiding rotary member is spaced apart from the folding panel and a contact position which is lower than the spaced-apart position and where the guiding rotary member is in contact with the folding panel; and a stopper mounted to the upper support frame and configured to restrict a downward movement of the guide device support member.

13. The gluer apparatus as recited in claim 1, wherein the corrugated paperboard sheet comprises: a first panel; a second panel connected to the first panel; a third panel connected to the second panel; and a fourth panel connected to the third panel, and wherein the folding panel is the first panel or the fourth panel, and the non-folding panel is the second panel or the third panel.

14. A conveyance assist device for use in a gluer apparatus for applying an adhesive to a to-be-bonded part of a corrugated paperboard sheet, the conveyance assist device being mountable to the gluer apparatus, wherein the corrugated paperboard sheet comprises: a non-folding panel; and a folding panel to be folded with respect to the non-folding panel after the adhesive is applied to the to-be-bonded part, wherein the to-be-bonded part is provided in the folding panel, and the folding panel is connected to the non-folding panel through a connection part, wherein the gluer apparatus comprises: a first conveyance device configured to convey the non-folding panel in a conveyance direction while contacting the non-folding panel; an applicator device configured to apply the adhesive to the to-be-bonded part while contacting the to-be-bonded part, wherein the conveyance assist device is configured to, in a state in which it is mounted to the gluer apparatus, convey the folding panel in the conveyance direction while contacting the folding panel, during contact between the applicator device and the to-be-bonded part, and wherein the conveyance assist device comprises:

a first rotary member configured to be rotated according to driving of a drive source;

a support member mounted to a support frame of the gluer apparatus;

a second rotary member rotatably mounted to the support member; and a belt wound around the first rotary member and the second rotary member, and configured to be circulated based on driving of the drive source, while contacting a lower surface of the folding panel, to convey the folding panel in the conveyance direction.

* * * * *